United States Patent [19]

Wijmans et al.

[11] Patent Number: 5,044,166

[45] Date of Patent: Sep. 3, 1991

[54] REFRIGERATION PROCESS WITH PURGE AND RECOVERY OF REFRIGERANT

[75] Inventors: Johannes G. Wijmans, Menlo Park; Richard W. Baker, Palo Alto, both of Calif.

[73] Assignee: Membrane Technology & Research, Inc., Menlo Park, Calif.

[21] Appl. No.: 488,730

[22] Filed: Mar. 5, 1990

[51] Int. Cl.⁵ .............................................. F25B 47/00
[52] U.S. Cl. .......................................... 62/85; 62/475
[58] Field of Search ................... 62/85, 475; 55/16, 71

[56] References Cited

U.S. PATENT DOCUMENTS

| | | | |
|---|---|---|---|
| 2,955,673 | 10/1960 | Kennedy et al. | 62/475 X |
| 2,971,352 | 2/1961 | Parker | 62/475 |
| 2,986,905 | 6/1961 | Kocher et al. | 62/475 |
| 3,013,404 | 12/1961 | Endress et al. | 62/475 X |
| 3,145,544 | 8/1964 | Weller | 62/85 X |
| 3,357,197 | 12/1967 | Massengale | 62/475 X |
| 3,664,147 | 5/1972 | Blackmon | 62/85 |
| 4,304,102 | 12/1981 | Gray | 62/85 X |
| 4,435,191 | 3/1984 | Graham | 62/475 X |
| 4,444,571 | 4/1984 | Matson | 62/475 X |
| 4,553,983 | 11/1985 | Baker | 62/475 X |
| 4,717,407 | 1/1988 | Choe et al. | 62/475 X |
| 4,906,256 | 3/1990 | Baker et al. | 62/475 X |
| 4,942,741 | 7/1990 | Hancock et al. | 62/85 X |

*Primary Examiner*—Lloyd L. King
*Attorney, Agent, or Firm*—J. Farrant

[57] ABSTRACT

A refrigeration process including a refrigeration cycle, and refrigerant purge and recovery operations is disclosed. The refrigeration cycle may be a vapor compression cycle or an absorption cycle, for example. A purge stream is withdrawn from the refrigeration cycle and subjected to treatment by means of a membrane separation unit. The purge-stream treatment operation produces an essentially pure refrigerant stream, suitable for return to the refrigeration cycle, and an air stream, clean enough for direct discharge to the atmosphere. The process is applicable to most refrigerants, but is particularly useful in minimizing atmospheric emissions of chlorofluorocarbons, such as CFC-11 and CFC-12.

19 Claims, 17 Drawing Sheets

REFRIGERATION PROCESS WITH PURGE AND RECOVERY OF REFRIGERANT

FIELD OF THE INVENTION

This invention relates to a refrigeration process. More particularly, the invention relates to a refrigeration process in which refrigerant/air mixtures are purged from the refrigeration cycle and treated by means of a membrane separation process to recover refrigerant and to reduce atmospheric pollution.

BACKGROUND OF THE INVENTION

Refrigeration is the use of mechanical or heat-activated machinery for cooling purposes. Refrigeration is commonly accomplished in a reverse Carnot cycle, by using as refrigerant a fluid that evaporates and condenses at suitable pressures and temperatures to enable practical equipment to be manufactured. In a vapor compression refrigeration cycle, the vapor is typically compressed, then condensed by chilling with air or water, then expanded to a low pressure and correspondingly low temperature through an expansion valve. Subsequent evaporation of the refrigerant provides the cooling action. In an absorption refrigeration cycle, cooling is also achieved by expansion of a high-pressure vapor into a low-pressure region. The resulting low-pressure vapor is absorbed into water, then separated from the water at high pressure in a stripper.

Many fluids that can serve as refrigerants under appropriate conditions are known. Refrigerants are generally grouped into three classes, depending on their toxicity and flammability. Group 3 refrigerants are highly toxic or flammable, and are therefore used only in special circumstances, such as where the refrigerant is available on-site as a process or product chemical, and the existing hazard is not exacerbated by the use. Such refrigerants include hydrocarbons such as methane, propane and butane. Group 2 refrigerants are slightly toxic or flammable, and include ammonia, which is still used widely, as well as sulfur dioxide. Group 1 refrigerants are non-toxic and non-flammable, and are, therefore, the most widely used over a broad spectrum of refrigeration needs. Mosts of the Group 1 refrigerants are halogenated hydrocarbons, containing one or more chlorine, fluorine or bromine atoms in their structures. For example, industrial refrigerators use vast quantities of CFC-12 and other chlorofluorocarbons (CFCs), which, although they are non-toxic and non-flammable, are now recognized to have a disastrous environmental impact.

Refrigeration can be carried out either as a closed-cycle or open-cycle process. Open-cycle operation is mostly used in the chemical process industry, where advantage is taken of the presence in the chemical process of a product that can also serve as refrigerant. For example, natural gas liquids removed by cooling and compressing raw natural gas may be expanded in a refrigeration cycle to further lower the temperature of the raw gas, thereby recovering more of the heavier hydrocarbons. Ammonia synthesis plants use the product stream to refrigerate ammonia storage tanks.

For most other industrial purposes, closed-cycle refrigerators are used. The refrigerant is contained in an essentially closed loop, where it cycles round from high-pressure vapor to high-pressure liquid to low-pressure liquid to low-pressure vapor. The low-pressure, evaporating portion of the system may be at atmospheric pressure or may be below atmospheric pressure, depending on the thermodynamic properties of the refrigerant and the cooling temperature. For practical reasons, refrigeration systems using CFC refrigerants are frequently operated with the evaporating pressure as low as 2-5 psia.

Because a large portion of the refrigeration system is at sub-atmospheric pressure, air leaks into the system on the low pressure side. Air leaks are almost unavoidable in large industrial refrigerators; thus air contaminated with refrigerant vapor must be periodically purged from the system. In conventional purge systems, a gas stream, containing refrigerant and air, is withdrawn from the high-pressure side of the cycle. To reduce the refrigerant loss, the stream is maintained at the high purge pressure and then cooled, typically down to as low as $-50°$ F. or below. The low-temperature refrigerant can conveniently be used to effect the cooling. Under these conditions, the bulk of the refrigerant contained in the stream is condensed and passed back to the refrigerator. The remainder is vented to the atmosphere. The frequency and thoroughness with which the purging operation is carried out is dictated by energy and economic considerations. If the air content within the loop is allowed to build up over a prolonged period, the partial pressure of the air in the system may become substantial. As a result, the total compressor pressure required to maintain the refrigerant partial pressure at an adequate level becomes higher and higher, with a corresponding increase in energy consumption and costs.

The air content of the refrigerator can be kept at a constant low level by continuous purging. Cooling the purge gas typically enables as much as 90% or more of the refrigerant to be recovered from the purge stream by condensation. Nevertheless the air that is vented to the environment may contain as much as 15% refrigerant. Running the purge-gas treatment condenser at pressure and temperature conditions where essentially no refrigerant is lost imposes an excessively heavy load on the condenser, consumes excessive energy, and becomes impractical economically. The need to drastically control or eliminate CFC emissions to the atmosphere has been recognized throughout the world and is the subject of increasingly stringent regulatory laws. CFC refrigerants, besides their environmental unacceptability, are becoming increasingly expensive. Refrigerator discharges represent a serious environmental problem and waste of resources. A 10 scfm condenser vent stream containing 5% or more CFC is typical of many that are found throughout the food and pharmaceutical industries, for example. Such a discharge corresponds to a CFC loss of 0.16 lb/min, or approximately 80,000 lb/yr. When multiplied by the many hundred industrial refrigeration plants in use nationwide, this rate of loss represents a large source of CFC pollution and waste resources. Thus there is an urgent need to improve refrigeration technology to drastically reduce or eliminate CFC discharges. Similar, if less critical, concerns apply to other refrigerants. Because of the adverse effect on the operation of the refrigeration cycle, there is also a need for improved methods of keeping the air content of the cycle as low as possible.

Attempts have been made to monitor and/or treat purge streams from refrigeration operations by various means besides condensation. For example, U.S. Pat. No. 4,485,289 to Lofland describes a distillation process for recovering CFCs from refrigerator purge streams. U.S. Pat. No. 4,531,375 to Zinsmeyer describes a refrigeration system including means for monitoring a refrigerator purge system and correcting excess discharge of purge gases. U.S. Pat. No. 4,484,453 to Niess describes a method for controlling non-condensable gases at a predetermined concentration in an ammonia refrigerator by sensing the temperature at which the ammonia condenses.

Separation of gas or vapor mixtures by means of permselective membranes has been known to be possible for many years, and membrane-based gas separation systems are emerging to challenge conventional separations technology in a number of areas. That membranes have the potential to separate organic or inorganic vapors from air is known. For example, U.S. Pat. No. 4,553,983, commonly owned with the present invention, describes a process for separating airstreams containing low concentrations of organic vapor (2% or less) from air, using highly organic-selective membranes. U.S. Pat. No. 3,903,694 to Aine describes a concentration driven membrane process for recycling unburnt hydrocarbons in an engine exhaust. U.S. Pat. No. 2,617,493 to Jones describes separation of nitrogen from concentrated hydrocarbon feedstreams. Pending patent application Ser. No. 327,860, now U.S. Pat. No. 4,906,256, commonly owned with the present invention, describes a membrane separation process for treating air or other gas streams containing fluorinated hydrocarbons, such as CFCs.

SUMMARY OF THE INVENTION

The invention is an improved refrigeration process, involving the combination of a refrigeration cycle, a purge operation to remove air or other non-condensable gases from the refrigerator, and treatment of the purged gas by a membrane separation system to recover the refrigerant.

The refrigeration cycle is preferably a closed-cycle operation in which a refrigerant is brought to a low temperature, for example, either by vapor compression or absorption. The refrigeration cycle may take the form of (a) a simple cycle, in which a single refrigerant circulating in a single cycle is used, (b) a compound cycle in which more than one compression/expansion cycle is used, but a common refrigerant circulates throughout, or (c) a cascade, in which a series of separate refrigeration cycles are used to achieve successively lower temperatures.

Any of the refrigerants known in the art may be used, including inorganic compounds such as ammonia, sulfur dioxide or carbon dioxide, saturated and unsaturated hydrocarbons such as propane, butane, ethylene or propylene, and halogenated hydrocarbons, such as many of the chlorofluorocarbons (CFCs) and hydrochlorofluorocarbons (HCFCs). The purpose of the purge operation is to remove air or any other non-condensable gases that have entered the refrigeration system. It is desirable to maintain the amount of air circulating with the refrigerant at a very low level, because the presence of air in the refrigerant vapor means that the compressor has to operate at higher pressures than would otherwise be necessary. As the level of air in the system builds up, the system becomes more and more inefficient. The purge operation involves withdrawing a portion of the refrigerant vapor, either continuously or periodically. For example, the vapor may be withdrawn through a pressure-actuated valve, connected in the high-pressure vapor portion of the cycle, that opens automatically when the pressure within the system exceeds a certain value. The purged vapor may contain from only very small amounts of non-condensable gas, such as less than 1%, up to a substantial percentage, say 5%, 10%, 15%, or above.

The treatment of the purge stream is designed to recover as much of the refrigerant as possible, and to leave a residual air stream that is clean enough for discharge to the atmosphere without adverse environmental effects. The purge-stream treatment operation involves separating the refrigerant and air by running the purge gas stream across a membrane that is selectively permeable to the refrigerant. The refrigerant is therefore concentrated in the stream permeating the membrane; the residue, non-permeating, stream is correspondingly depleted in refrigerant. The driving force for permeation across the membrane is the pressure difference between the feed and permeate sides. If the purge stream is withdrawn from the high-pressure portion of the cycle, as is normally done, no additional driving force for membrane permeation need be provided. The membrane separation process produces a permeate stream enriched in the refrigerant compared with the feed and a residue stream depleted in the refrigerant.

The efficiency of the process, in terms of the relative proportions of refrigerant and air in the feed, permeate and residue streams, will be determined by a number of factors, including the pressure difference, the selectivity of the membrane, the proportion of the feed that permeates the membrane, and the membrane thickness. The present invention is applicable to feedstreams with a broad range of refrigerant concentrations. Effective membrane separation is possible, even when the membrane selectivity is modest. In one possible embodiment, the process produces a permeate stream from which the pure liquid refrigerant can be recovered by cooling and/or compressing the permeate stream. The liquid refrigerant might then be returned to the refrigeration cycle in the liquid portion of the cycle. As another option, it may be possible to return the permeate vapor directly to the refrigeration cycle on the low-pressure vapor side.

The membrane separation process may be configured in many possible ways, and may include a single membrane stage or an array of two or more units in series or cascade arrangements. Eighty to 99% or above removal of the refrigerant content of the feed to the membrane system can be achieved with an appropriately designed membrane separation process, leaving a residue stream containing only traces of the refrigerant. The permeate stream is typically concentrated 5- to 100-fold compared with the feedstream.

The discussion above describes embodiments of the invention in which the membrane used to separate the refrigerant from air is preferentially permeable to the refrigerant. Embodiments of the invention in which the membrane is selectively permeable to air are also possible. In this case the non-permeating, or residue, stream is enriched in the refrigerant. The particular advantage of this method of operation is that, depending on the selectivity of the membrane, the nature of the refrigerant, and operating parameters, it may be possible to maintain a substantially lower air level within the refrigerator than can be economically achieved using the refrigerant-selective membrane options. In this case also, the membrane separation step may be configured as a single or multiple stage operation.

If refrigerant-selective membranes are used, a preferred embodiment of the invention incorporates a purge-gas treatment step in which the purge gas is passed through a condenser prior to entering the membrane separation unit. Purge-gas streams have previously been treated by condensation and many industrial refrigerators are already fitted with condensers for this purpose. The purge gas withdrawn from the refrigerator is normally at high pressure, for example, around 100 psi, so simply cooling the purge gas will cause a fraction of the refrigerant to condense out. Conventional condensation units attached to refrigerators may remove up to about 90% of the refrigerant that passes through them. If the condenser is followed by a membrane separation unit, the requirement for a high degree of removal by the condenser may be eased. The condenser may be operated at a less cold temperature, thereby saving energy and costs, and yet achieving essentially complete recovery of the refrigerant. The membrane system can typically remove 90 or 95% of the refrigerant that reaches it from the condenser. Thus the combination of the condenser and the membrane separator will achieve a much higher degree of refrigerant recovery than could be achieved by the condenser alone. For example, suppose the condensation step removes only 50% of the refrigerant. If the condensation step is followed by a membrane separation step that can remove 80% of the refrigerant reaching it, then the total removal obtained by the process is 90%. If the condensation step removes 80%, and is followed by a membrane separation step that also removes 80%, then the total removal obtained by the process is 96%. If the condensation step removes 80% and the membrane separation step 90%, the total removal is 98%.

The process of the invention exhibits a number of advantages over conventional refrigeration processes. Membrane separation systems are characterized by low energy consumption compared with other separation techniques. The driving force for permeation through the membrane is provided by a pressure difference between the feed and permeate sides of the membrane. In the present process, the purge gas from the refrigerator is already at a high pressure compared with atmospheric pressure, so the membrane separation can be achieved in some embodiments without supplying any additional energy at all. The value of the additional refrigerant that is recovered may be substantial, particularly in the case of CFCs and HCFCs. Thus the process of the invention can provide a much improved recovery rate for the refrigerant, for example from 80% to 95%, or from 90% to >99%, coupled with a net reduction in the operating cost. Another significant advantage, again particularly important for CFCs and HCFCs, is that the amount of refrigerant discharged to the environment as vent gas is reduced by 90% or more. By providing a more efficient purge cycle, the process of the present invention also reduces the energy demand on the compressor in the refrigeration cycle, because it becomes easier and cost effective to maintain a lower circulating air content.

It is an object of the invention to provide a refrigeration process in which emissions of refrigerant to the atmosphere are eliminated or minimized.

It is an object of the invention to provide an improved method of treating refrigerator purge gases.

It is an object of the invention to provide an energy-saving refrigeration process.

It is an object of the invention to separate refrigerants from air.

It is an object of the invention to reduce the load on a compressor used in a refrigeration cycle.

It is an object of the invention to reduce the load on a condenser used to recover purged refrigerant.

Other objects and advantages of the invention will be apparent from the description of the invention to those of ordinary skill in the art.

It is to be understood that the above summary and the following detailed description are intended to explain and illustrate the invention without restricting its scope.

BRIEF DESCRIPTION OF THE DRAWINGS

FIG. 6 is a schematic of a two-stage membrane system. FIG. 7 is a schematic diagram of a two-step membrane system.

DETAILED DESCRIPTION OF THE INVENTION

Figure 1:
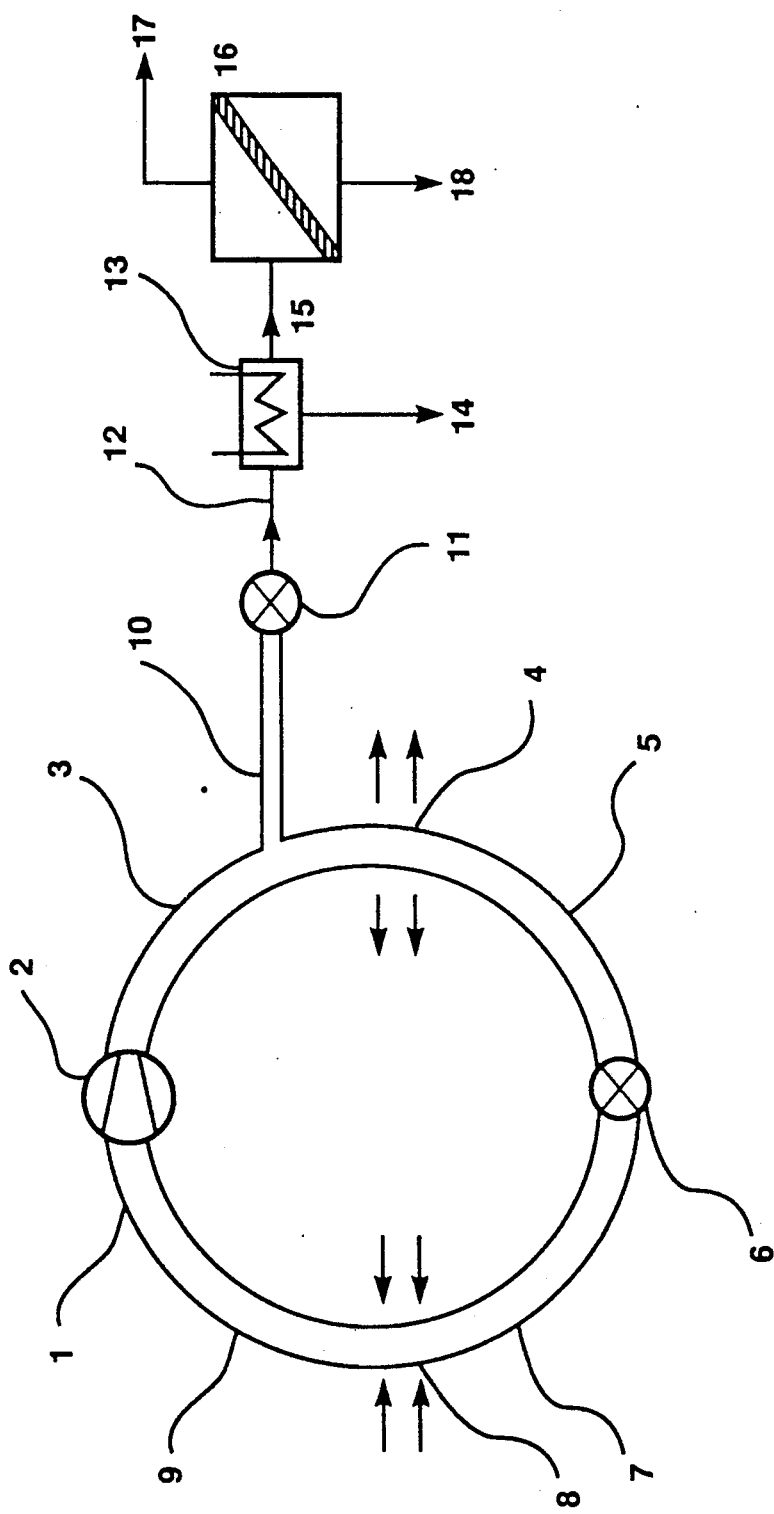
FIG. 1 is a schematic showing an embodiment of the invention, employing a condenser and a refrigerant-selective membrane.

The term vapor as used herein refers to organic or inorganic chemical compounds in the gaseous phase below their critical temperatures.

The term CFC as used herein refers to hydrocarbons containing at least one fluorine atom and one chlorine atom.

The term HCFC as used herein refers hydrocarbons containing at least one fluorine atom, one chlorine atom and one hydrogen atom.

The term hydrocarbon as used herein means saturated or unsaturated hydrocarbons.

The term permselective as use herein refers to polymers, or membranes made from those polymers, that exhibit selective permeation for at least one gas or vapor in a mixture over the other components of the mixture, enabling a measure of separation between the components to be achieved.

The term permeability of a polymer film means the rate at which a gas or vapor passes through a unit cross section of that film of unit thickness under a unit driving force.

The term selectivity means the ratio of the permeabilities of two gases or vapors, the permeabilities being determined with a mixture of gases or vapors at concentrations and under operating conditions representative of an actual membrane separation system.

The term air-selective means selective for nitrogen and selective for oxygen over the refrigerant.

The term multilayer as used herein means comprising a support membrane and one or more coating layers.

The term residue stream means that portion of the feedstream that does not pass through the membrane.

The term permeate stream means that portion of the feedstream that passes through the membrane.

The term stage-cut as used herein means the ratio of the membrane permeate volume flow to the membrane feed volume flow.

The term membrane unit as used herein means one or more membrane modules arranged in parallel, so that a portion of the incoming stream passes through each one.

The term series arrangement means an arrangement of membrane modules or units connected together such that the residue stream from one module or unit becomes the feedstream for the next.

The term cascade arrangement means an arrangement of membrane modules or units connected together such that the permeate stream from one module or unit becomes the feedstream for the next.

The term membrane array means a set of one or more individual membrane modules or membrane units connected in a series arrangement, a cascade arrangement, or mixtures or combinations of these.

The term product residue stream means the residue stream exiting a membrane array when the membrane separation process is complete. This stream may be derived from one membrane unit, or may be the pooled residue streams from several membrane units.

The term product permeate stream means the permeate stream exiting a membrane array when the membrane separation process is complete. This stream may be derived from one membrane unit, or may be the pooled permeate streams from several membrane units.

All percentages cited herein are by volume unless specifically stated otherwise.

The refrigeration process of the invention is a combination of a refrigeration cycle, withdrawing a purge stream, and treating the purge stream. The refrigeration cycle of the invention is a conventional mechanical cycle of either the vapor or the absorption type. The vapor cycle includes as basic elements a compressor, a condenser, an expansion valve and an evaporator, in that order. The compressor raises the pressure of the refrigerant vapor so that its saturation temperature is above the temperature of the coolant in the condenser. A transfer of heat from the refrigerant vapor to the coolant takes place, and the refrigerant condenses. The condensed liquid passes through the expansion valve to a low-pressure region of the cycle, where its saturation temperature is below the temperature of the material to be refrigerated. A transfer of heat takes place to the refrigerant, causing the refrigerant to evaporate. The low pressure vapor is removed by the compressor and the cycle continues. The compressors and condensers used in the refrigeration cycle may take any of the common forms known in the art. For example, the compressor may be of the reciprocating or centrifugal types. Multiple compressors arranged in series or parallel may be used. The condenser may conveniently be water cooled, such as a basic shell-and-tube condenser, or air cooled, in which case air may be blown over the condenser by propeller fans. The evaporator may also be of the shell-and-tube design, where the exchange surfaces are either flooded or sprayed with refrigerant liquid.

In an absorption cycle, the refrigerant, usually ammonia, is alternately absorbed into water, then stripped from the water at high pressure. The cycle includes the stripper, a condenser, an expansion valve, an evaporator and an absorber. Ammonia at high pressure is withdrawn from the top of the stripper, condensed and passed through an expansion valve to form a low-pressure liquid. As in the vapor cycle, the liquid then passes through the evaporator. The resulting low-pressure vapor is absorbed into water in a conventional absorber, and the resulting liquid is pumped back to the stripper.

The construction and operation of refrigeration cycles is well known in the art. For more details, the four-volume handbook published by the American Society of Heating, Refrigerating and Ventilating Engineers, Publications Dept., Atlanta, Ga., provides comprehensive information on refrigerator design considerations and equipment.

The refrigeration cycle used in the process of the invention may be simple, complex or cascade.

Any refrigerant may be used in the process of the invention. Representative refrigerants include, from Group 1, carbon dioxide, CFC-11, CFC-12, CFC-13, CFC-22, CFC-23, CFC-113 and CFC-114, HCHF-123, HCFC-142b and HCFC-134a from Group 2, carbon tetrachloride, ammonia and sulfur dioxide, and from Group 3, methane, ethane, propane, butane, isobutane, ethylene and propylene.

The purge stream, containing the refrigerant and air that has entered the refrigeration cycle, is withdrawn from the refrigeration cycle either continuously or periodically. The rate of withdrawal can be chosen, depending on the amount of air leakage into the system and the level to which the air content within the cycle is to be reduced or at which it is to be maintained. It is preferable to withdraw the purge continuously, or for lengthy periods, if possible, so that the membrane unit can also operate without the need for frequent shutdown and start-up. A valve is used to control the refrigerant withdrawal. The valve may be manually operated, or may be automatically opened at certain time intervals or at a chosen pressure, for example. The purge stream contains refrigerant and air, preferably, although not necessarily, with air as the minor component of the stream. Typically the air content of the purge stream may range from less than 1% to 50%. Preferably, the purge stream is withdrawn from the high-pressure vapor segment of the refrigeration cycle. In a cascade cycle, separate purge streams may be withdrawn from each stage.

A membrane system is used to treat the purge stream. The permeability of a gas or vapor through a membrane is a product of the diffusion coefficient, D, and the Henry's law sorption coefficient, k. D is a measure of the permeant's mobility in the polymer; k is a measure of the permeant's sorption into the polymer, and depends in part on the condensability of the vapor. The diffusion coefficient tends to decrease as the molecular size of the permeate increases, because large molecules interact with more segments of the polymer chains and are thus less mobile. Depending on the nature of the polymer, either the diffusion or the sorption component of the permeability may dominate. In rigid, glassy polymer materials, diffusion is usually the predominant factor controlling permeation, so glassy membranes tend to permeate nitrogen or oxygen, for example, faster than the larger organic molecules. For embodiments of the invention requiring an air-selective membrane, therefore, membranes made from glassy polymers are preferred.

In elastomeric membrane materials, the effect of the sorption coefficient can be dominant, so that the condensable refrigerant will permeate the membrane much faster than nitrogen or oxygen. For refrigerant-selective embodiments of the invention, therefore, elastomeric membrane materials are preferred. Hydrophobic elastomers are preferred for hydrophobic refrigerants; for hydrophilic refrigerants, such as ammonia, carbon dioxide and sulfur dioxide, more hydrophilic materials may be more suitable.

In the process of the present invention, the purge stream from the refrigerator cycle, which may optionally have been subjected to condensation to recover a portion of the refrigerant, and which contains refrigerant vapor and air is passed across a thin, permselective membrane. The permselective membrane forms a barrier that is relatively permeable to one component of the stream, but relatively impermeable to the other. The membrane may take the form of a homogeneous membrane, a membrane incorporating a gel or liquid layer, or any other form known in the art.

To achieve a high flux of the permeating components, the permselective membrane should be made as thin as possible. Preferred embodiments of the invention involve the use of a composite membrane comprising a microporous support, onto which the permselective layer is deposited as an ultrathin coating. The microporous support membrane should have a flow resistance that is very small compared to the permselective layer. A preferred support membrane is an asymmetric membrane, consisting of a relatively open, porous substrate with a thin, dense, finely porous skin layer. Suitable polymers for making asymmetric support include polysulfones, polyimides, polyamides and polyvinylidene fluoride. Asymmetric polysulfone and polyimide membranes available commercially for ultrafiltration applications are also suitable as supports. Isotropic support membranes, such as microporous polypropylene or polytetrafluoroethylene may also be used in some cases. The thickness of the support membrane is not critical, since its permeability is high compared to that of the permselective layer. However the thickness would normally be in the range 100 to 300 microns, with about 150 microns being the preferred value.

Optionally, the support membrane may be reinforced by casting it on a fabric or paper web, made from polyester or the like. The multilayer membrane then comprises the web, the microporous membrane, and the ultrathin permselective membrane.

The permselective membrane is deposited on the dense skin of the support membrane, for example by dip coating. The dip coating method is described, for example, in U.S. Pat. No. 4,243,701 to Riley et al. In a typical dip-coating process, the support membrane from a feed roll is passed through a coating station, then to a drying oven, and is then wound onto a product roll. The coating station may be a tank containing a dilute polymer or prepolymer solution, in which a coating typically 50 to 100 microns thick is deposited on the support. Assuming a 1% concentration of polymer in the solution, after evaporation a film 0.5 to 1 micron thick is left on the support.

Alternatively, the permselective membrane may be cast by spreading a thin film of the polymer solution on the surface of a water bath. After evaporation of the solvent, the permselective layer may be picked up onto the microporous support. This method is more difficult in practice, but may be useful if the desired support is attacked by the solvent used to dissolve the permselective material.

The thickness of the permselective layer should normally be in the range 0.1 to 20 microns, preferably 5 microns or less, and more preferably 0.1 to 2 micron.

Preferred polymers for use as refrigerant-selective membranes include rubbery non-crystalline polymers, i.e. those that have a glass transition temperature below the normal operating temperature of the system. Thermoplastic elastomers are also useful. These polymers combine hard and soft segments or domains in the polymer structure. Provided the soft segments are rubbery at the temperature and operating conditions of the invention, polymers of this type could make suitable membranes for use in the invention. Polymers that may be used include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters. To maximize the flux of permeating components, the permselective layer should be made as thin as possible. However, the permselective layer must also be free of pinholes or other defects that could destroy the selectivity of the membrane by permitting bulk flow-through of gases. In the context of the invention, a particularly preferred rubber is silicone rubber. Silicone rubber solutions can wet a finely microporous support and leave a uniform, defect-free coating after solvent evaporation, so the preferred membrane is one in which the permselective coating is deposited directly on the microporous support. However optional embodiments that include additional sealing or protective layers above or below the permselective layer are also intended to be encompassed by the invention.

Preferred polymers for use as air-selective membranes include glassy materials such as polysulfones, polyimides, polyamides, polyphenylene oxide, polycarbonates, ethylcellulose or cellulose acetate. Glassy materials are more difficult than elastomers to form into thin-film composite membranes. Preferred embodiments of the process employing air-selective membranes use asymmetric glassy membranes in which the thin, dense skin serves as the permselective layer. Such membranes are known in the gas-separation art, and may be prepared, for example, by various modifications of the Loeb-Sourirajan process. This process involves preparing a solution of the polymer in a suitable solvent, casting a thin film and then immersing the film in a precipitation bath. The resulting membrane has an asymmetric structure graded from openly microporous on the support surface to non-porous or very finely microporous on the skin side. Such gas-separation membranes are frequently overcoated with a sealing layer on the skin side, to prevent bulk flow of gases through pores or other defects. The preparation and properties of asymmetric gas-separation membranes are described, for example, in U.S. Pat. No. 4,230,463 to Henis and Tripodi, or U.S. Pat. No. 4,840,646 to Dow Chemical.

The permselective membranes used in the present invention should preferably have a selectivity for refrigerant/nitrogen or nitrogen/refrigerant of at least 5, and more preferably at least 10, and most preferably at least 20. Table 1 lists experimentally measured selectivities for a number of common refrigerants. In each case, the membrane used was a thin-film composite membrane with a silicone rubber permselective layer. The measurements were made at 20° C. As a general rule, lowering the temperature will increase the selectivity and vice versa. For refrigerants such as $CHF_3$, where the membrane selectivity is only 4 at room temperature, a much better membrane performance would be obtained by performing the membrane separation operation at low temperature. As shown in the table, the membrane selectivity increases to 14 at −39° C.

TABLE 1

Membrane Selectivity for Refrigerant Over Nitrogen for Common Refrigerants, measured with a silicone rubber membrane at 20° C.

| Refrigerant | Group | Boiling point (°C.) | Selectivity (at 20° C.) |
|---|---|---|---|
| Inorganic Compounds | | | |
| Ammonia | 2 | −33 | 20 |
| Sulfur dioxide | 2 | −10 | 50 |
| Carbon dioxide | 1 | −18 | 11 |
| Hydrocarbons | | | |
| Methane | 3 | −161 | 3 |
| Ethane | 3 | −89 | 10 |
| Propane | 3 | −42 | 20–40 |
| Butane | 3 | 0 | 70–100 |
| Isobutane | | −12 | 70–100 |
| Ethylene | 3 | −104 | 2–4 (est) |
| Propylene | 3 | −48 | 15–20 |
| Chlorinated Hydrocarbons | | | |
| $CCl_4$ | 2 | 77 | 100–200 |
| $CCl_3F$ | 1 | 24 | 30–50 |
| $CCl_2F_2$ | 1 | −30 | 6 |
| $CClF_3$ | 1 | −81 | 0.6 |
| $CHClF_2$ | 1 | −41 | 15 |
| $CHF_3$ | 1 | −82 | 4 (14 at −39° C.) |
| $CCl_2FCClF_2$ | 1 | 48 | 20 |
| $CClF_2CClF_2$ | 1 | 4 | 9–11 |

TABLE 1-continued

Membrane Selectivity for Refrigerant Over Nitrogen for Common Refrigerants, measured with a silicone rubber membrane at 20° C.

| Refrigerant | Group | Boiling point (°C.) | Selectivity (at 20° C.) |
|---|---|---|---|
| $C_2HCl_2F_3$ | 1 | | 25 |
| $C_2H_3ClF_2$ | 1 | | 13–15 |

The form in which the membranes are used in the invention is not critical. They may be used, for example, as flat sheets or discs, coated hollow fibers, or spiral-wound modules, all forms that are known in the art. Spiral-wound modules are a preferred choice. References that teach the preparation of spiral-wound modules are S. S. Kreman, "Technology and Engineering of ROGA Spiral Wound Reverse Osmosis Membrane Modules", in *Reverse Osmosis and Synthetic Membranes*, S. Sourirajan (Ed.), National Research Council of Canada, Ottawa, 1977; and U.S. Pat. No. 4,553,983, column 10, lines 40–60. Alternatively the membranes may be configured as microporous hollow fibers coated with the permselective polymer material and then potted into a module.

The flux of a gas or vapor through a polymer membrane is proportional to the pressure difference of that gas or vapor across the membrane. To achieve high fluxes of the permeating components, it is desirable not only to make the permselective membrane very thin, but also to operate the system with a substantial pressure drop across the membrane. The purge gas stream is withdrawn from the high-pressure vapor segment of the refrigeration cycle. The purge gas stream is therefore normally at a pressure substantially above atmospheric, and may be at a pressure as high as 100 psia or 200 psia. Consequently an adequate driving force for many embodiments of the invention may be provided by keeping the permeate side of the membrane at atmospheric pressure and using the high pressure inherently available in the refrigeration cycle. The performance of the membrane system depends not only on the membrane selectivity and the pressure drop across the membrane, but also on the ratio feed pressure: permeate pressure. It can be shown theoretically that, even for an infinitely selective membrane, the concentration of the preferentially permeating component on the permeate side of the membrane can never be greater than $\phi$ times the concentration in the feed, where $\phi$ is feed pressure/permeate pressure. To achieve an adequate pressure ratio with the permeate pressure at atmospheric requires that the feed pressure preferably be above about 60 psi. In many cases, the purge gas withdrawn from the refrigeration cycle will be at a pressure substantially above 60 psi. If the feed pressure to the membrane is not sufficiently high to provide a useful pressure ratio, then a pressure drop across the membrane can be provided by drawing a partial vacuum on the permeate side of the membrane. Subatmospheric pressure on the permeate side can also be sustained in some cases simply by continuously condensing and withdrawing the permeate stream.

In embodiments using refrigerant-selective membranes, the residue stream will be the air stream. The refrigerant content of the air should be reduced to a level at which the air can be vented to the atmosphere with minimal loss of refrigerant or environmental pollution. Preferably the residue stream should contain less than 10%, more preferably less than 5% of the refrigerant that was in the feed to the membrane unit. If air-selective membranes are used, the permeate will be the air stream and similarly should be clean enough for discharge.

The process of the invention can be carried out using membrane system designs tailored to particular requirements in terms of the composition of the feed to the membrane unit, and the desired compositions of the residue and permeate streams. The purge gas stream may optionally be subjected to a condensation step to recover a substantial portion of the refrigerant, followed by the membrane treatment step. Some representative embodiments of the invention are described below. These embodiments are illustrative of workable configurations, but are not intended to limit the scope of the invention in any way. Those of skill in the refrigeration or membrane arts will appreciate that many other embodiments in accordance with the invention are possible.

REPRESENTATIVE EMBODIMENTS USING REFRIGERANT-SELECTIVE MEMBRANE

1. Purge-gas treatment step comprises condensation followed by membrane separation:

A preferred mode for carrying out the invention is to subject the withdrawn purge gas to a condensation step that precedes the membrane treatment step. If the purge gas contains a high percentage of refrigerant, and is at a high pressure, both of which will usually be the case, then cooling the gas stream will cause a fraction of the refrigerant process using this treatment scheme is shown in FIG. 1. Referring now to this figure, the refrigeration cycle, 1, is a single vapor cycle. Compressor, 2, creates a region of high-pressure refrigerant vapor, 3. The vapor passes into a heat-exchange zone, 4, where heat is given off to a coolant and the vapor condenses to create a high-pressure liquid zone, 5. The refrigerant then passes through expansion valve, 6, to a low-pressure liquid zone, 7. Heat exchange between the product to be refrigerated and the refrigerant takes place in evaporator zone, 8. The resulting low-pressure vapor in zone, 9, is recompressed and the cycle starts again. A high-pressure purge stream, 12, is withdrawn from the refrigeration cycle through outlet, 10, and valve, 11. The purge stream is passed through condenser, 13, which may be simply a water or air-cooled condenser operating at above 0° C., or may be refrigerated, either by making use of the existing refrigeration cycle or by means of a separate, smaller refrigerator. Condenser temperatures down to about −45° C. can be reached in a single-cycle chilling operation. If a lower condenser temperature is used, a compound or cascade system could be used. This would be a very undesirable mode of operation, because of the complexity and high energy consumption, unless the refrigeration cycle itself were a compound or cascade cycle, through which the purge stream could easily be fed. The presence of the membrane treatment unit means that the amount of refrigerant removed by the condenser is not a critical factor in the design. The combined condensation/membrane separation treatment step may be tailored so that the condensation step can be performed above 0° C. This can be advantageous in situations where the purge gas stream contains water vapor, for example, in embodiments using an absorption refrigeration cycle, because the need to defrost the condenser regularly will then be avoided. On the other hand, the selectivity of some polymers for organic vapors over air increases with decreasing temperature. In cases where the refrigerant selectivity at room temperature is poor, therefore, a better separation may be obtained in the membrane step by chilling the purge gas to a relatively low temperature before it passes through the membrane unit.

The fraction of refrigerant remaining in the purge gas stream after the condensation step depends on the vapor/liquid equilibrium at the operating conditions under which the condensation step is performed. If a condensation step is used, it is generally preferable that the condensation step be designed to remove at least 50% of the refrigerant present in the withdrawn purge stream. Operation under extreme conditions, to achieve 95% or more refrigerant removal is usually unnecessary, because of the presence of the membrane step. The overall degree of condensable removal and recovery that can be achieved by the combined condensation/membrane separation step is a multiple of the removal achieved in the individual steps. For example, suppose the condensation step removes 50% of the refrigerant. If the condensation step is followed by a membrane separation step that can remove 80% of the refrigerant reaching it, then the total removal obtained by the process is 90%. If the condensation step removes 80%, and is followed by a membrane separation step that also removes 80%, then the total removal obtained by the process is 96%. If the condensation step removes 80% and the membrane separation step 90%, the total removal is 98%.

The above discussion is intended to show that the process can be tailored to achieve a desired degree of refrigerant in a highly efficient manner. The tailoring can be done by comparing estimates of the energy and dollar costs with several sets of system configurations and operating conditions. For example, the costs and energy requirements to achieve 95% total removal, using an initial condensation step removing 50, 75 or 90% of refrigerant component, followed by a membrane separation step removing 90, 80 or 50% of the remaining refrigerant, could be compared.

Figure 2:
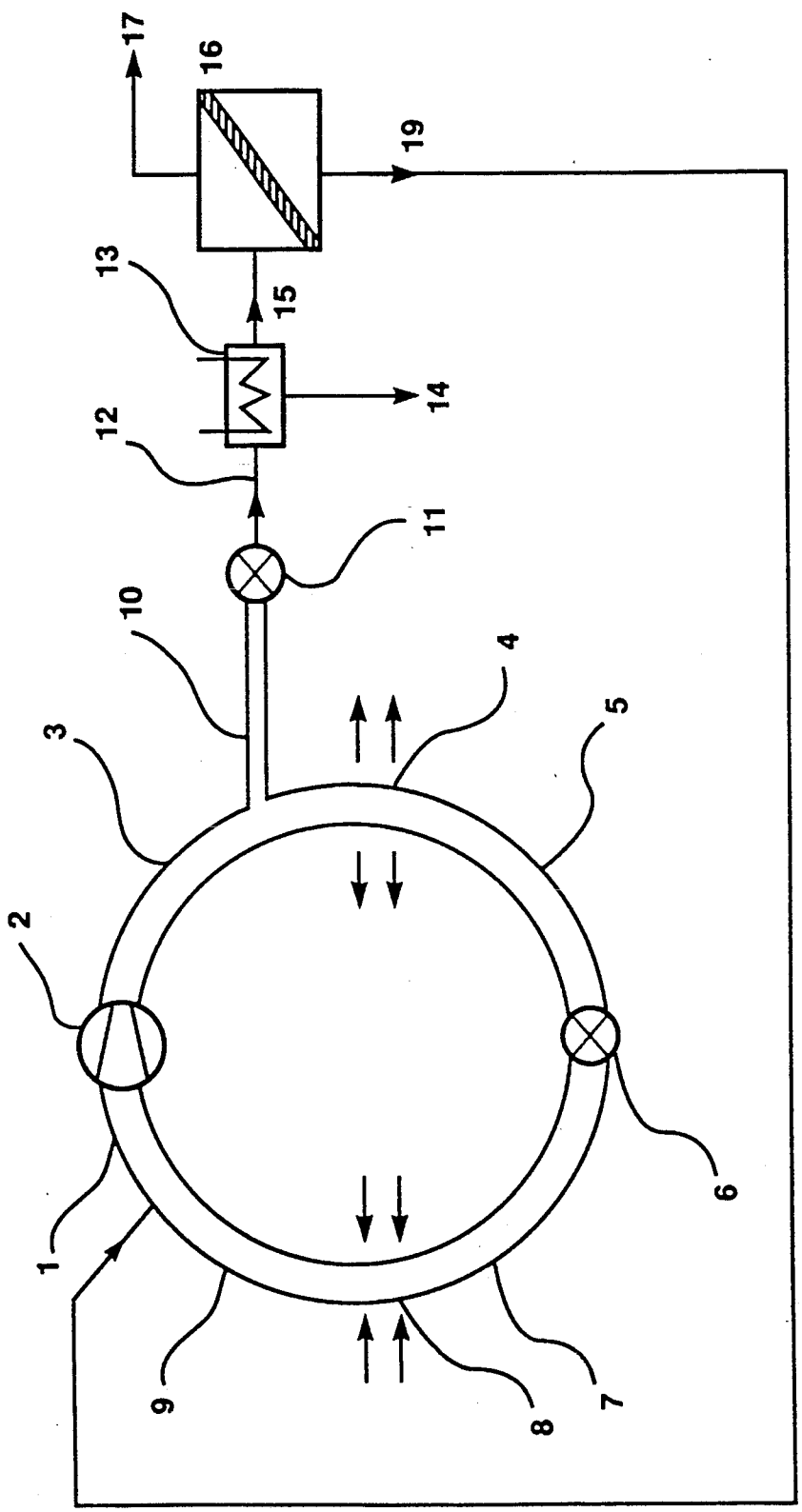
FIG. 2 is a schematic showing an embodiment of the invention wherein the membrane permeate vapor is returned directly to the refrigeration cycle.
Figure 3:
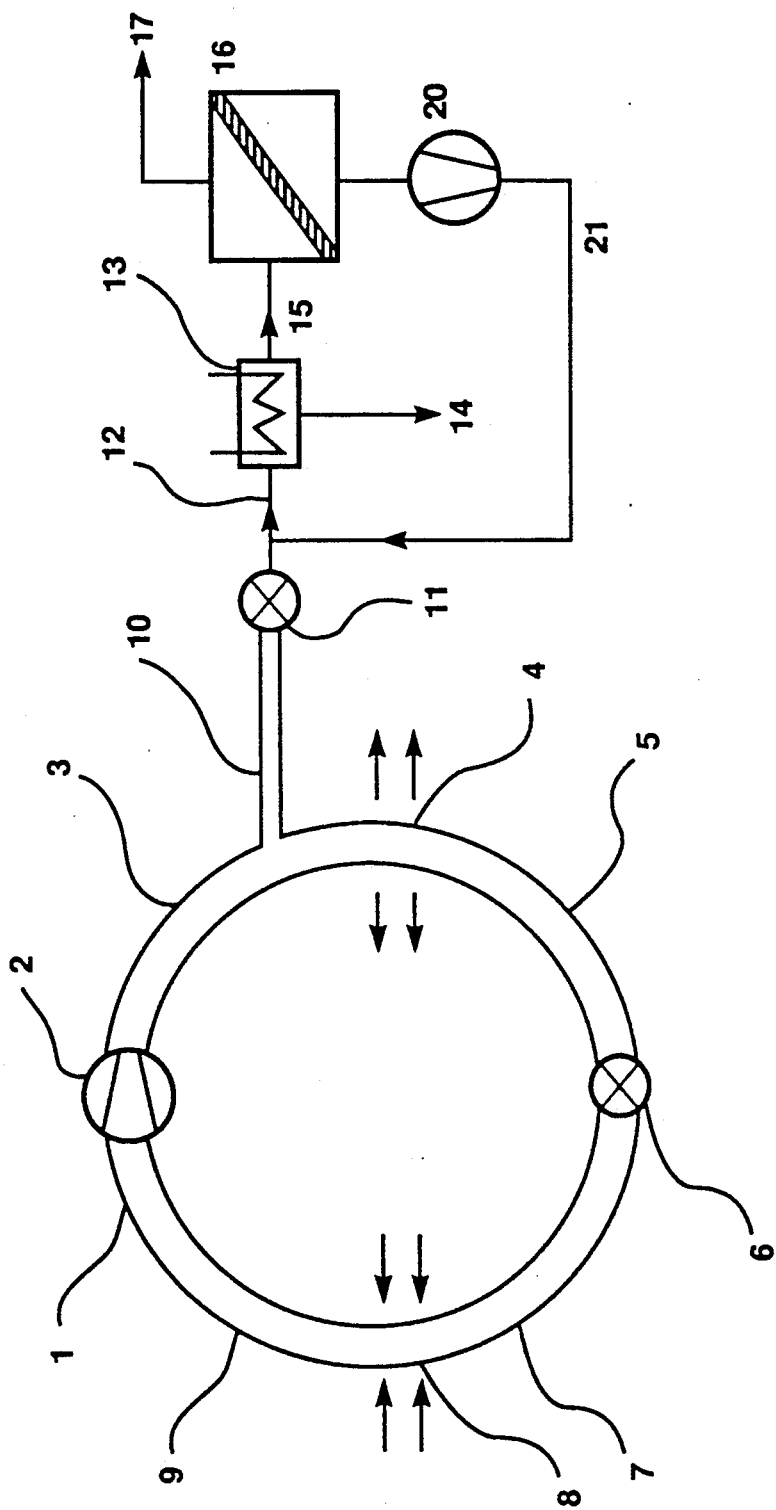
FIG. 3 is a schematic showing an embodiment of the invention wherein the membrane permeate stream is returned to the condenser.

The liquid refrigerant stream, 14, from the condenser may be drawn off for reuse in the refrigeration cycle. Stream, 15, which is at high pressure compared with atmospheric and which contains non-condensed refrigerant and air, passes to membrane unit, 16, containing one or more membranes that are selectively permeable to the refrigerant. The permeate stream, 18, is therefore enriched in refrigerant compared with stream 15. If the selectivity is high, and the stream from the condenser is not too dilute, permeate stream, 18, may be sufficiently concentrated to be fed back to the refrigeration cycle. FIGS. 2 and 3 show such options. The residue stream, 17, from the membrane operation, which may still be at above atmospheric pressure, is sufficiently reduced in refrigerant concentration that it can be discharged to the atmosphere. Preferably this residue stream contains less than 1% refrigerant, more preferably less than 0.5% refrigerant.

2. Permeate vapor is returned to refrigeration cycle:

Referring now to FIG. 2, this is a variation of the embodiment of FIG. 1. In this case, the permeate stream, 19, is withdrawn from the membrane separation operation and returned directly to the low-pressure vapor zone of the refrigeration cycle. This option requires no additional compressor or condenser to handle the permeate stream. On the other hand, because membranes are not infinitely selective, the permeate stream will always contain some air that will, therefore, reenter the refrigeration cycle, and have to pass through the main compressor again.

3. Permeate vapor is recompressed, then returned to condenser:

Referring now to FIG. 3, permeate stream, 20, is compressed in compressor, 20, and returned to the condenser, 15. This may be preferable to feeding the permeate vapor directly back to the refrigeration cycle, because compressor, 20, is relatively small, and no air is fed back to the refrigeration cycle. The overall energy consumption of this system may therefore be less than that of FIG. 2.

REPRESENTATIVE EMBODIMENTS USING AIR-SELECTIVE MEMBRANE

Figure 4:
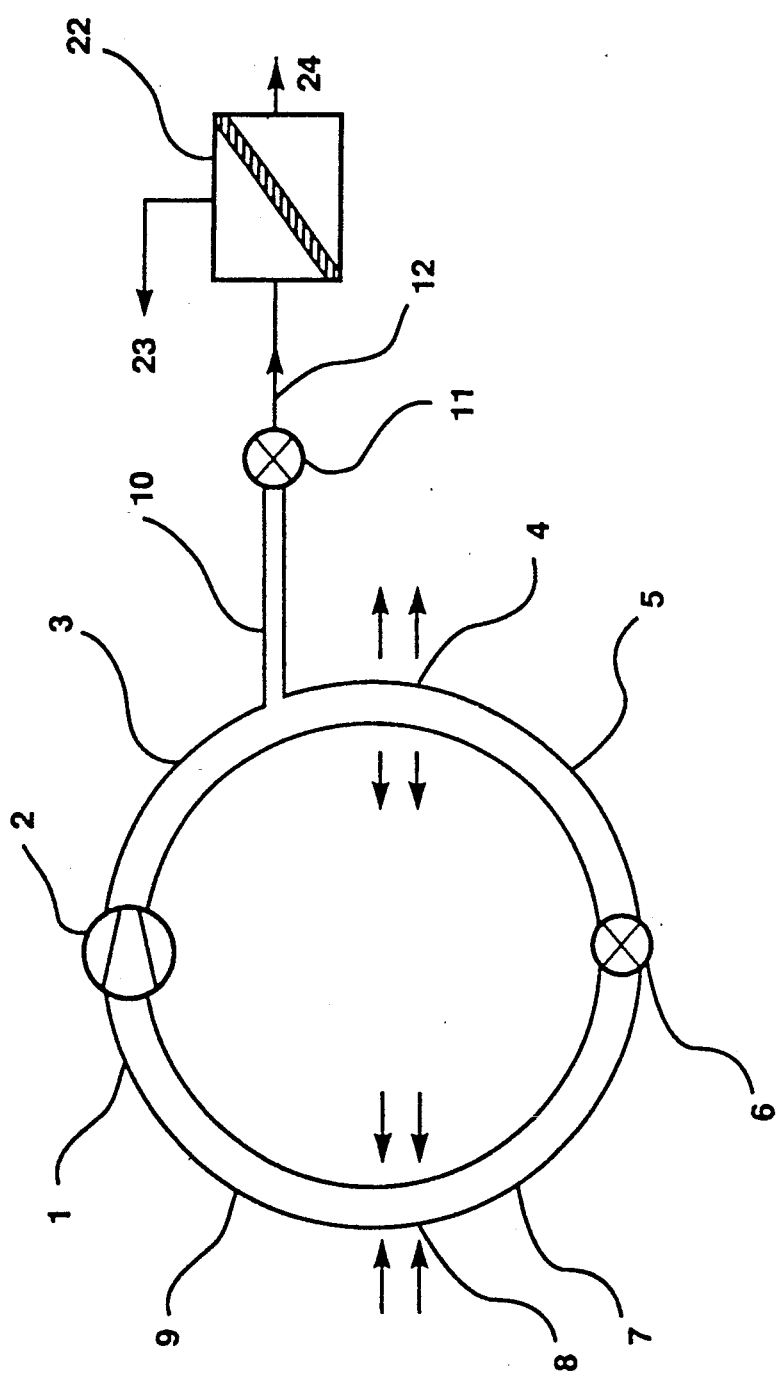
FIG. 4 is a schematic showing an embodiment of the invention incorporating a nitrogen-selective membrane.

1. Air-selective membrane treatment only:

Other embodiments of the invention involve a membrane treatment step in which air-selective membranes are used to directly treat the purge gas stream, without a prior condensation. A basic form of such an embodiment is shown in FIG. 4. Referring now to this figure, the refrigeration cycle and the purge withdrawal operate in the same manner as in the embodiments of FIGS. 1, 2 and 3. The purge stream, 12, at high pressure compared with atmospheric pressure, is passed directly to membrane unit, 22, containing an air-selective membrane. The permeate stream, 24, is thus enriched in nitrogen and oxygen compared with stream 12. The residue stream contains concentrated refrigerant. If the purge gas concentration, membrane selectivity and operating parameters are such that a very good separation is achieved in the simple, single-stage membrane operation, it may be possible to vent the permeate stream and to return the residue stream, with or without liquifying it, to the refrigeration cycle, as in the refrigerant-selective embodiments of FIGS. 2 and 3. Unless extremely selective membranes, having a selectivity for nitrogen over refrigerant of 200, 500 or even more are available, it is likely that the permeate stream, at least, will require further treatment. However, in a membrane separation process, it is usually desirable to keep the stage-cut low to achieve a good separation. Thus the volume of the permeate stream is normally much smaller than the volume of the feed and residue streams. An advantage of air-selective embodiments such as FIG. 4, therefore, is that the volume of the permeate air stream containing refrigerant vapor that must be condensed or otherwise treated is very small compared with the total purge gas volume. This means it may become economically viable to operate the refrigeration cycle with the air content maintained at a lower level than was previously possible, thereby reducing the head pressure that must be achieved by the refrigerant cycle compressor.

2. Combination of air-selective and refrigerant-selective membranes:

The purge gas stream as it is withdrawn from the refrigeration cycle may typically contain 90% refrigerant and 10% air, for example. If the purge stream is passed across a membrane having a selectivity for nitrogen over the refrigerant of about 20, for example, then even if the stage-cut is kept low, the permeate stream may still contain 20–30% refrigerant. This level is far too high to discharge the permeate stream directly to the atmosphere. However if the permeate stream, 24, is now passed through a refrigerant-selective membrane unit, the refrigerant concentration can be reduced to a point where discharge is possible. The residue stream from the refrigerant-selective membrane operation could now be discharged, and the permeate stream from the refrigerant-selective unit could be recycled to the feed side of the air-selective unit.

In embodiments incorporating an air-selective membrane unit followed by a refrigerant-selective membrane unit, it will normally be necessary to lower the pressure on the permeate side of the refrigerant-selective unit below atmospheric pressure, because the feed to this unit will be at, or close to, atmospheric pressure.

3. Combination of air-selective membrane and condensation:

a) Purge-gas treatment step comprises membrane treatment followed by condensation step:

This process is the same as that described in embodiment 1 as far as the refrigeration cycle, the purge gas withdrawal and the passage through the air-selective membrane are concerned. In this case, however, the permeate stream, 24, is optionally recompressed and then cooled, preferably using the cooling portion of the refrigerant cycle, to recover a stream of liquid refrigerant suitable for return to the refrigeration cycle. The non-condensed gases, containing only very small quantities of refrigerant vapor, may now be discharged.

b) Purge-gas treatment step comprises membrane treatment preceded by condensation step:

To maximize the advantages of the embodiments of the invention described above, using air-selective membranes in the membrane treatment step, it is very desirable to use membranes that are highly selective for nitrogen over the refrigerant vapor.

Figure 5:
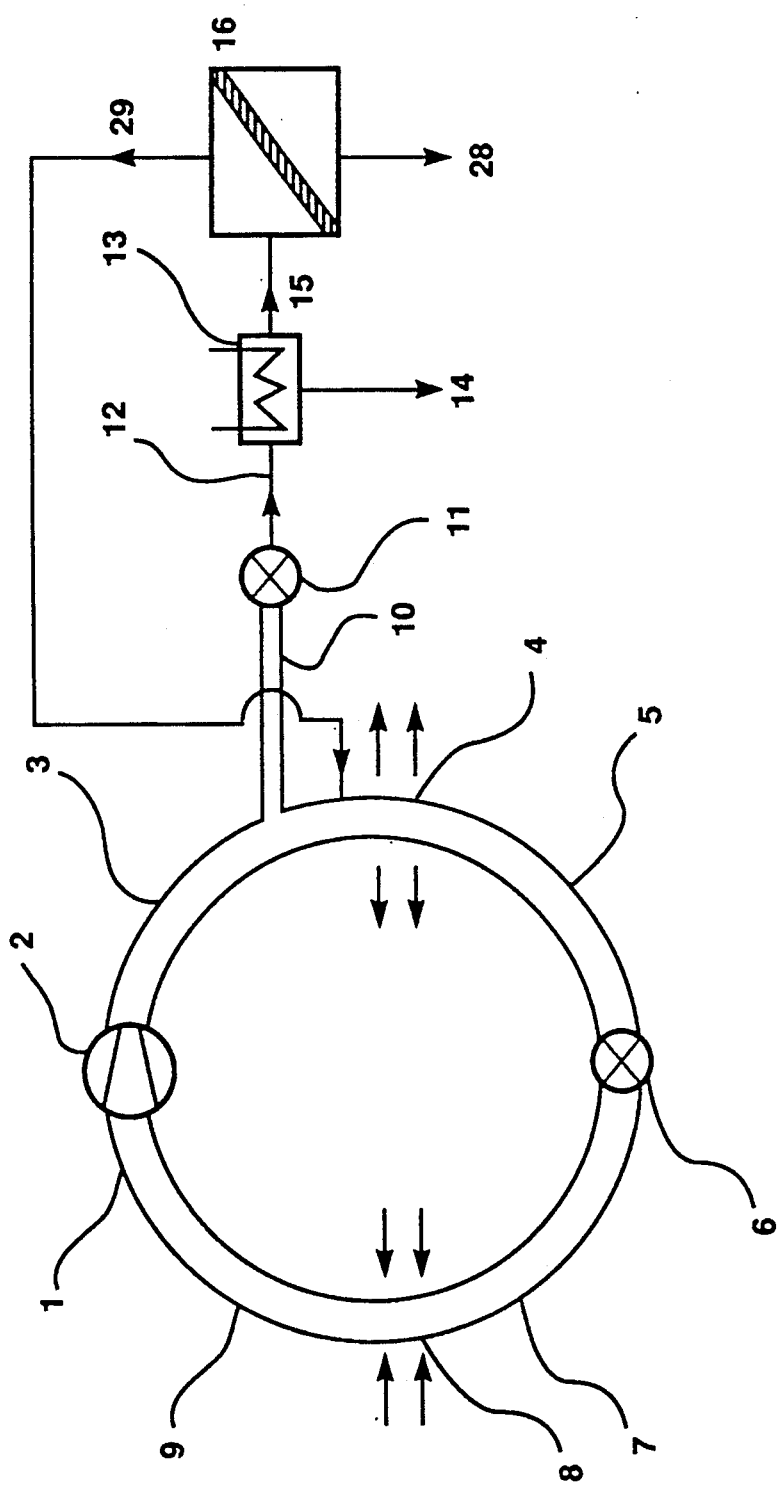
FIG. 5 is a schematic showing an embodiment of the invention incorporating a condenser followed by a nitrogen-selective membrane.

However, if membranes with selectivities for nitrogen over refrigerant of 10 or 20, for example, are available, it is still possible to design useful embodiments, such as that shown in FIG. 5. Referring now to this figure, the refrigeration cycle and the purge gas withdrawal operation are as described for FIG. 4. In this case, however, purge stream, 12, at high pressure compared with atmospheric pressure, passes to condenser, 13. As in the refrigerant-selective embodiments, this condenser may be a water or air-cooled condenser operating at above 0° C., or may be refrigerated, either by making use of the existing refrigeration cycle or by means of a separate, smaller refrigerator. Condenser temperatures down to about −45° C. can be reached in a single-cycle chilling operation; lower temperatures require a compound or cascade system. As with the refrigerant-selective options, it is convenient and cheap to use the existing refrigeration cycle to chill the condenser. Liquid refrigerant stream, 14, from the condenser is suitable for reuse. The non-condensed fraction, 15, from the condenser, which is at high pressure compared with atmospheric, is fed to membrane unit, 16, containing an air-selective membrane. The permeate stream, 28, from the membrane unit is mostly air containing only a very low concentration of refrigerant vapor. The residue stream, 29, contains refrigerant vapor at above atmospheric pressure. FIG. 5 shows an option in which this stream is returned to the high-pressure vapor segment of the refrigeration cycle. A recirculation blower or pump may optionally be used to maintain adequate flow of the recirculating vapor stream. Alternatively stream 29 could be liquified and returned to the liquid segment of the refrigeration cycle.

It may be seen from the above discussions that the purge-gas treatment operation may be configured in many different ways, tailored to achieve a highly efficient and economic recovery of refrigerant, and to minimize the atmospheric discharge of waste refrigerant vapors. Depending on the refrigerant that is used, the operating conditions of the refrigeration cycle, and the ability to use existing compression and/or condensation equipment, many different workable and practical embodiment could be designed. The goal of all modes of operation is that the purge-gas treatment operation produce only two streams: one a vent stream sufficiently free of refrigerant vapor that its discharge to the atmosphere has no adverse environmental effects; the other a product stream containing sufficiently pure refrigerant for return to the refrigeration cycle.

For simplicity, all the refrigeration processes discussed above have been described in terms of a simple, single-stage membrane operation. As will be appreciated by those of skill in the art, the membrane separation operation may be configured in many possible ways, and may include a single membrane stage or an array of two or more units in series or cascade arrangements. For example, a membrane array consisting of a two-stage cascade is shown schematically in FIG. 6. This type of membrane configuration could be used, for example, when the purge stream has been first subjected to condensation, and where the non-condensed gas from the condenser contains the refrigerant in a low concentration, such that a single pass through a membrane unit would not concentrate the refrigerant vapor to make it return to the refrigeration cycle desirable.

Figure 6:
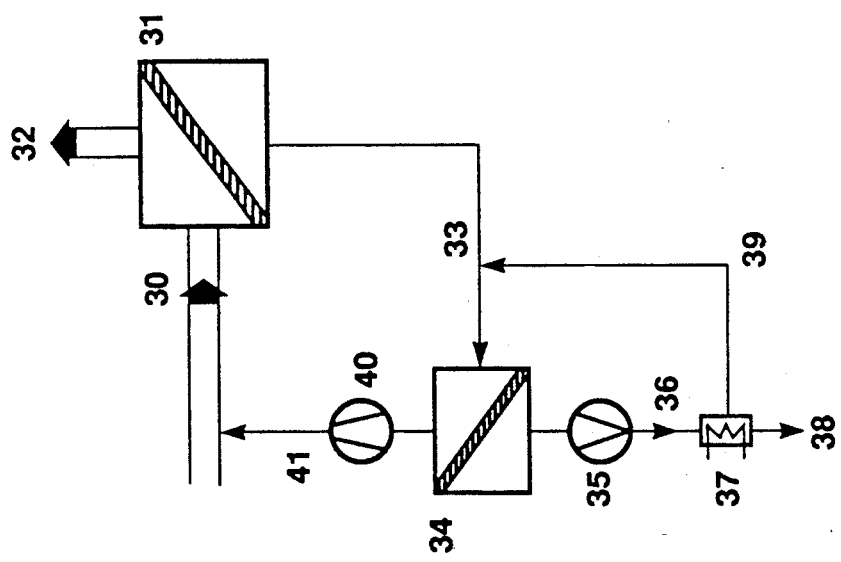
FIGS. 6 and 7 show optional configurations for the membrane system.

Referring now to FIG. 6, incoming purge stream, 30, containing refrigerant and air, passes to first membrane separation unit, 31, which contains membranes selectively permeable to the refrigerant. The non-permeating, residue stream, 32, is thus depleted in the refrigerant. The permeate stream, 33, is enriched in refrigerant, but still contains significant amounts of nitrogen and oxygen. The permeate from the first membrane unit, now at atmospheric pressure, is fed to second membrane unit, 34. A pressure difference across the second membrane unit is provided by vacuum pump, 35. The permeate stream, 36, from the second membrane unit is now highly concentrated in refrigerant and can be condensed in condenser, 37, to produce a liquid refrigerant stream, 38. Any non-condensed fraction, 39, can be recycled to the second membrane unit. The residue stream, 40, from the second membrane unit, depleted in refrigerant compared with stream 33, may optionally be recycled to the feed side of the first membrane unit. In this way the membrane operation produces only two streams, the liquid refrigerant stream, 38, suitable for return to the refrigeration cycle, and the essentially clean residue stream, 32, for discharge.

Figure 7:
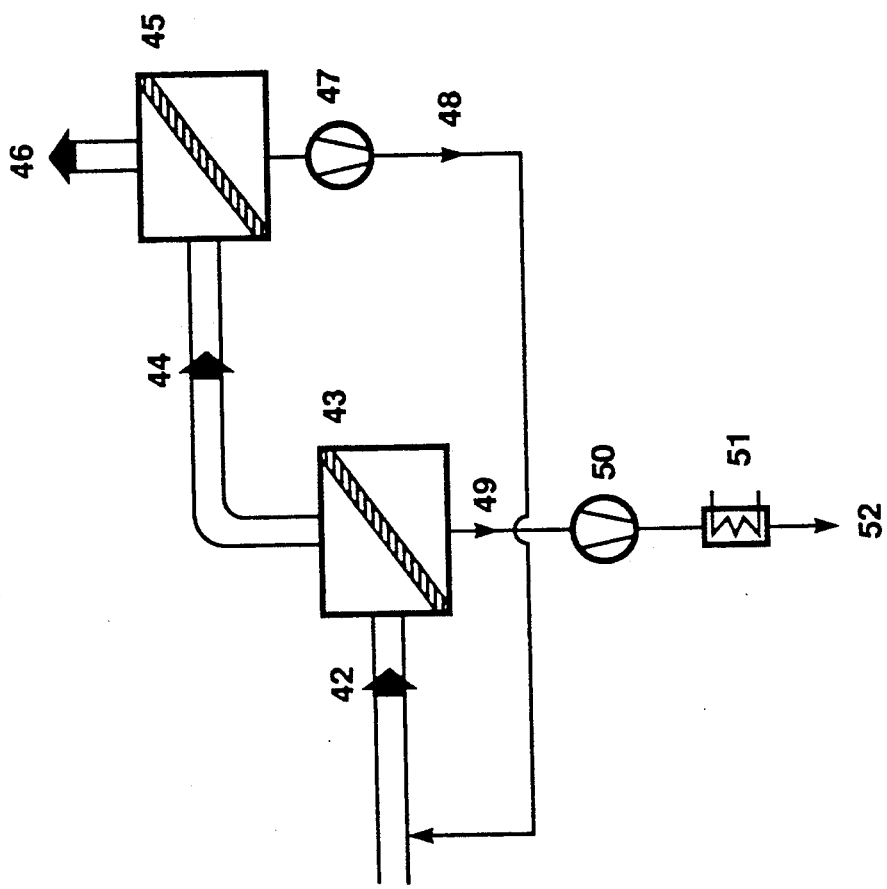

A second membrane array, consisting of a two-step series arrangement, is shown schematically in FIG. 7. This type of membrane unit could be used, for example, when essentially complete removal of refrigerant before venting is required. A two-step process will typically remove 99% or more of the refrigerant reaching it. Referring now to FIG. 7, incoming purge gas stream, 42, containing refrigerant and air, is passed to first membrane separation unit, 43, which contains membranes selectively permeable to the refrigerant. The permeate stream, 49, is enriched in the refrigerant and can be optionally liquified by means of compressor, 50, and condenser, 51, to yield a liquid refrigerant stream, 52, suitable for return to the refrigeration cycle. The residue stream, 44, is depleted in refrigerant compared with stream 42, but still contains too much refrigerant for discharge. Stream 44 is therefore fed to second membrane unit, 45. The residue stream, 46, from the second membrane unit is now sufficiently clean for discharge. The permeate stream, 48, from the second membrane unit, enriched in refrigerant compared with stream 42, may be recompressed by compressor, 47, and recycled to the feed side of the first membrane unit. In this way the membrane operation produces only two streams, the liquid refrigerant stream, 52, and the relatively clean air stream, 46.

Multiple-stage and multiple-step membrane operations, and combinations of these, could be used with embodiment using refrigerant-selective or air-selective membranes.

The invention is now further illustrated by the following examples, which are intended to be illustrative of the invention, but are not intended to limit the scope or underlying principles of the invention in any way. The example are divided into two groups. The first group, Examples 1–13 shows the separation performance that can be achieved for a number of common refrigerants using a typical thin-film composite membrane. The second group, Examples 14–27, shows typical performances achieved in the purge stream treatment operation.

EXAMPLES

Group 1 Examples

Examples 1–11. Experimental results with refrigerant-selective membranes.

Experimental Procedure

All sample feedstreams were evaluated in a laboratory test system containing one membrane module with a permselective silicone rubber membrane and membrane area of approximately 2,000 cm$^2$. The air in the feed cycle was replaced with nitrogen from a pressure cylinder prior to the experiment. Nitrogen was continuously fed into the system during the experiment to replace the lost nitrogen into the permeate. Solvent vapor was continuously fed into the system by either pumping liquid solvent into the residue line using a syringe pump and evaporating the solvent using additional heating, or sending a bypass stream of the residue through a wash bottle containing the liquid solvent. The feed and residue organic concentrations were determined by withdrawing samples from the appropriate lines by syringe and then subjecting these to gas chromatograph (GC) analysis. A small bypass stream was used to take the samples at atmospheric pressure instead of the elevated pressure in the lines. Two liquid nitrogen traps were used to condense the solvent contained in the permeate stream. For long-term experiments, a non-lubricated rotary-vane vacuum pump was used on the permeate side of the module. The samples from the permeate stream were taken using a detachable glass vessel constantly purged with a bypass stream of the permeate. Upon sampling, the vessel was detached and air was allowed to enter the vessel. The concentration in the vessel was determined by gas chromatography. The permeate concentration was then calculated from the relationship:

permeate conc. = conc. in vessel ×

$$\left(\frac{76\ cmHg}{permeate\ pressure\ (cmHg)}\right).$$

The procedure for a test with the system was as follows:

1. The system was run without solvent under maximum permeate vacuum to replace the air in the loop with nitrogen.
2. The nitrogen permeate flow rate was determined by measuring the vacuum pump exhaust flow rate. This provided a quality check on the module.
3. The feed flow, feed pressure and permeate pressure were adjusted to the desired values. The cold trap was filled with liquid nitrogen.
4. The solvent input was started and the feed concentration was monitored with frequent injections into the GC. The permeate pressure was adjusted if necessary.
5. The system was run until the feed analysis showed that steady state had been reached.
6. All parameters were recorded and a permeate sample was taken and analyzed.
7. Step 6 was repeated after 10-20 minutes. The feed concentration was monitored after each parameter change to ensure steady state had been reached.

EXAMPLE 1

CFC-11. Low Concentrations

Figure 8:
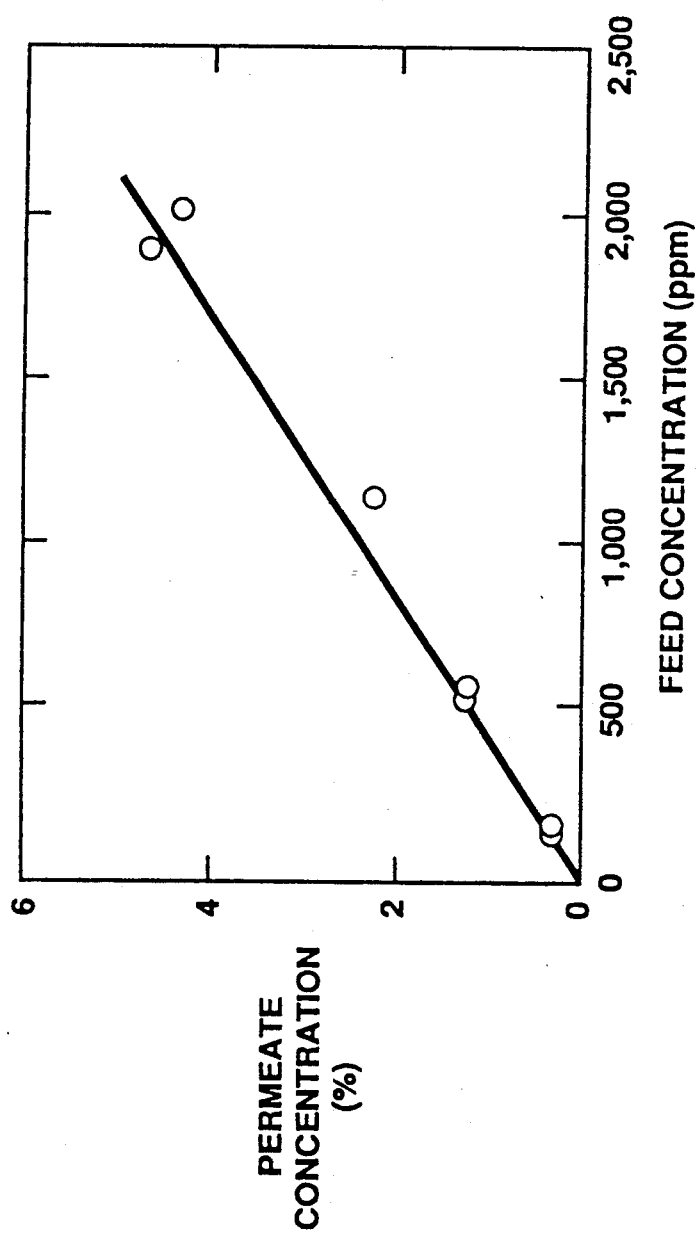
FIG. 8 is a graph showing the relationship between feed and permeate concentrations of CFC-11 at low CFC feed concentrations.
Figure 9:
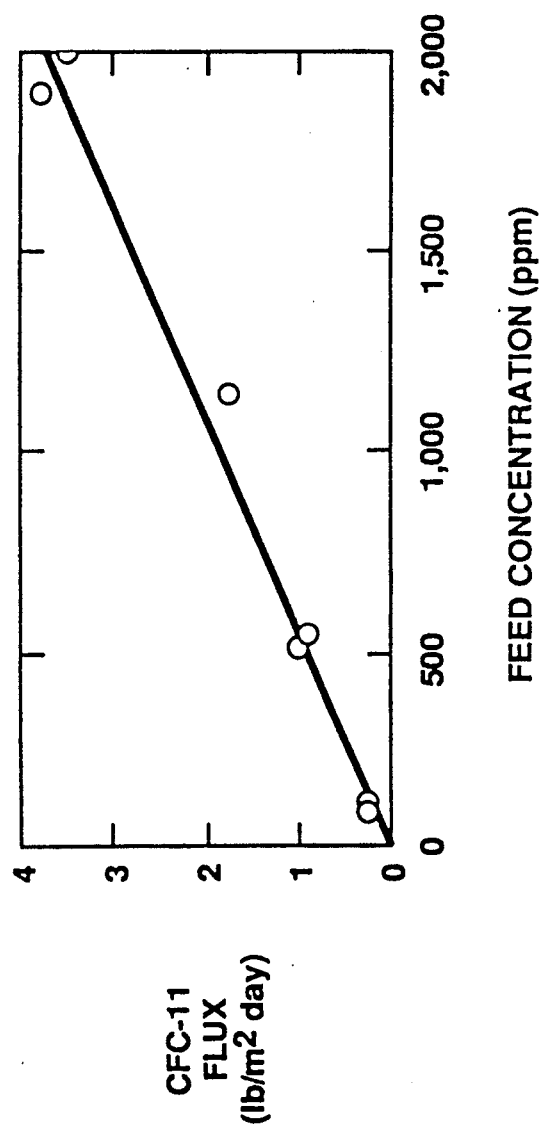
FIG. 9 is a graph showing the relationship between CFC-11 flux and feed concentration at low CFC feed concentrations.

The experimental procedures described were carried out using a feedstream containing CFC-11 ($CCl_3F$) in concentrations from 100-2,000 ppm. The results are summarized in FIGS. 8 and 9. The calculated $CFC/N_2$ selectivity of the module increased slightly from 22 at 100 ppm to 28 at 2,000 ppm. As can be seen from FIG. 6, up to about 4 lb/$m^2$.day of CFC-11 could be recovered, even from a very dilute stream in a very simple one-step process.

EXAMPLE 2

CFC-11. Higher Concentrations

Figure 10:
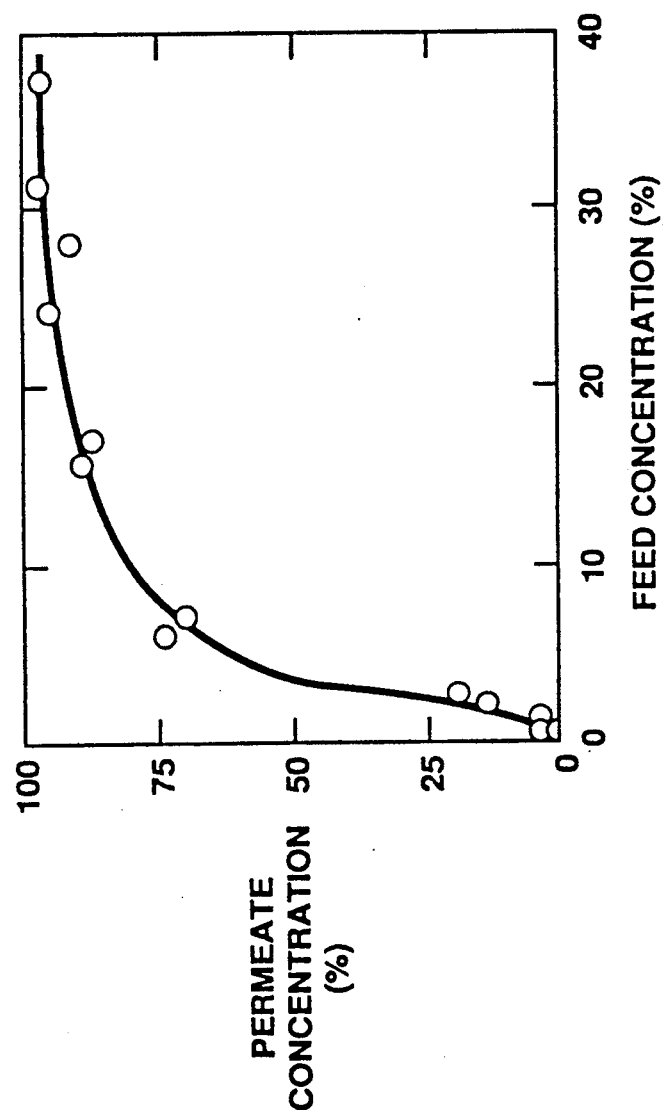
FIG. 10 is a graph showing the relationship between feed and permeate concentrations of CFC-11 at CFC feed concentrations up to about 35 vol%.
Figure 11:
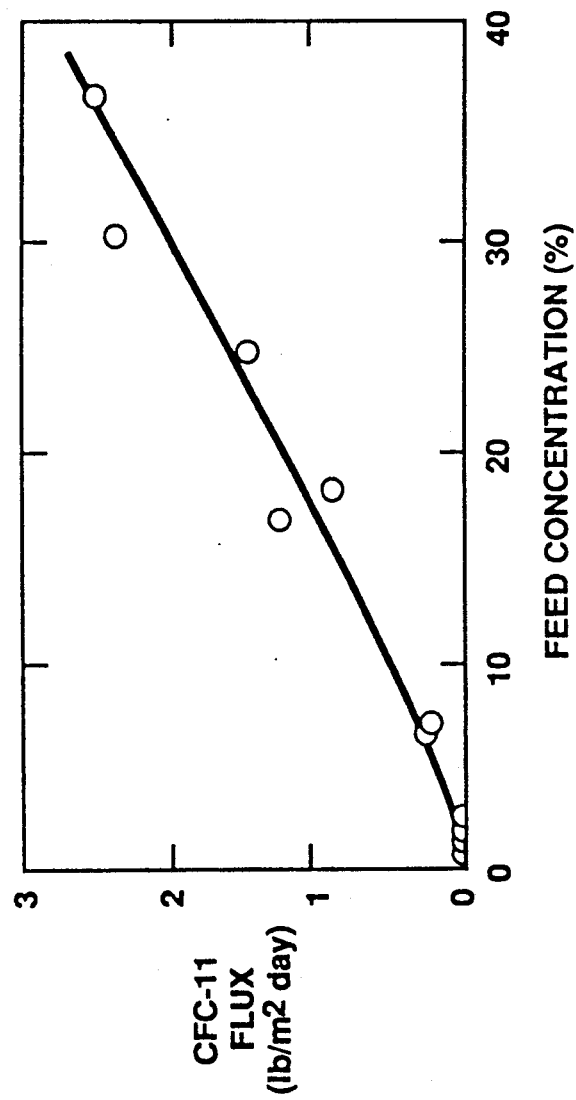
FIG. 11 is a graph showing the relationship between membrane selectivity and feed concentration of CFC-11 at CFC feed concentrations up to about 35 vol%.

The experimental procedures described were carried out using a feedstream containing CFC-11 ($CCl_3F$) in concentrations from 1-35 vol %. The results are summarized in FIGS. 10 and 11. The calculated $CFC/N_2$ selectivity of the module increased from 30 at 1 vol % to 50 at 35 vol %. This effect may be attributable to plasticization of the membrane material by sorbed hydrocarbon. Both hydrocarbon and nitrogen fluxes increased with increasing hydrocarbon feed concentration.

EXAMPLE 3

CFC-113. Low Concentrations

Figure 12:
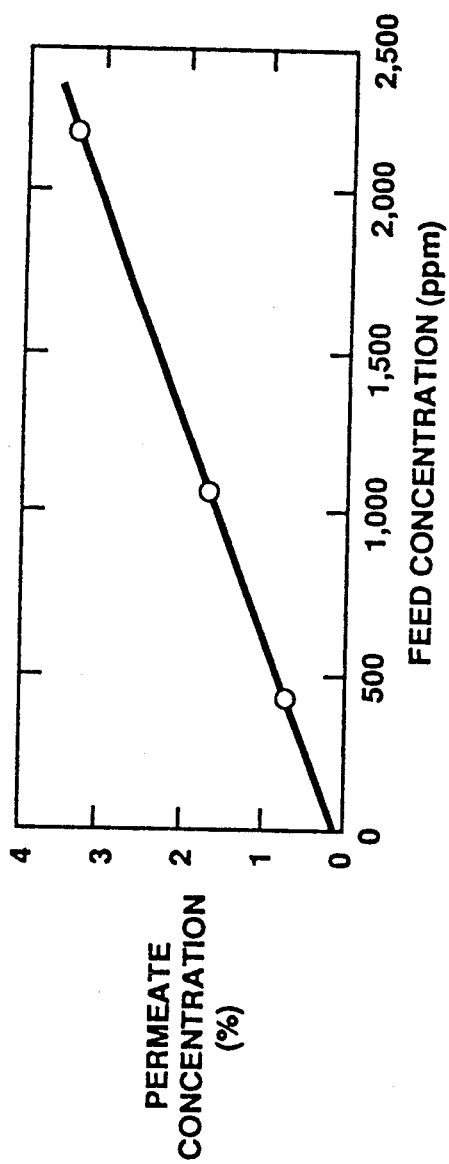
FIG. 12 is a graph showing the relationship between feed and permeate concentrations of CFC-113 at low CFC feed concentrations.

The experimental procedures described were carried out using a feedstream containing CFC-113 ($C_2Cl_3F_3$) in concentrations from 500-2,000 ppm. The results are summarized in FIG. 12. The calculated $CFC/N_2$ selectivity of the module remained constant at about 20 over the feed concentration range.

EXAMPLE 4

CFC-113. Higher Concentrations

Figure 13:
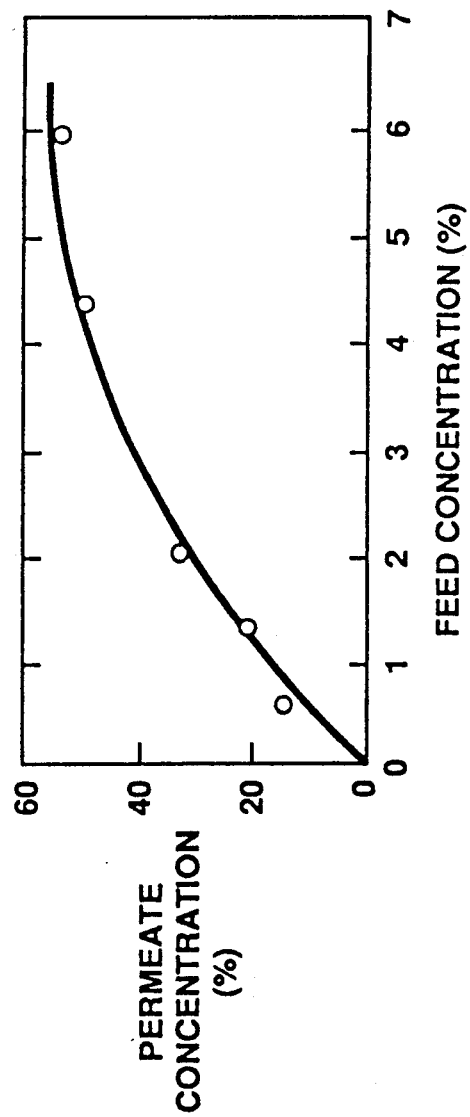
FIG. 13 is a graph showing the relationship between feed and permeate concentrations of CFC-113 at CFC feed concentrations up to about 6 vol%.

The experimental procedures described were carried out using a feedstream containing CFC-113 ($C_2Cl_3F_3$) in concentrations from 0.5-6 vol %. The results are summarized in FIG. 13. The calculated $CFC/N_2$ selectivity of the module remained constant at about 25 over the feed concentration range.

EXAMPLE 5

HCFC-123. Low Concentrations

Figure 14:
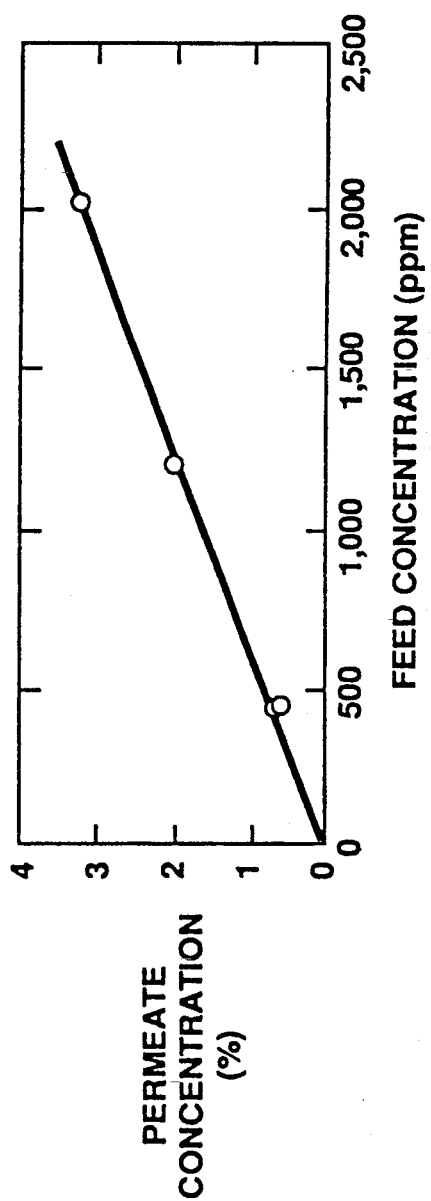
FIG. 14 is a graph showing the relationship between feed and permeate concentrations of HCFC-123 at low CFC feed concentrations.

The experimental procedures described were carried out using a feedstream containing HCFC-123 ($C_2HCl_2F_3$) in concentrations from 500-2,000 ppm. The results are summarized in FIG. 14. The calculated $CFC/N_2$ selectivity of the module remained constant at about 25 over the feed concentration range.

EXAMPLE 6

HCFC-123. Higher Concentrations

Figure 15:
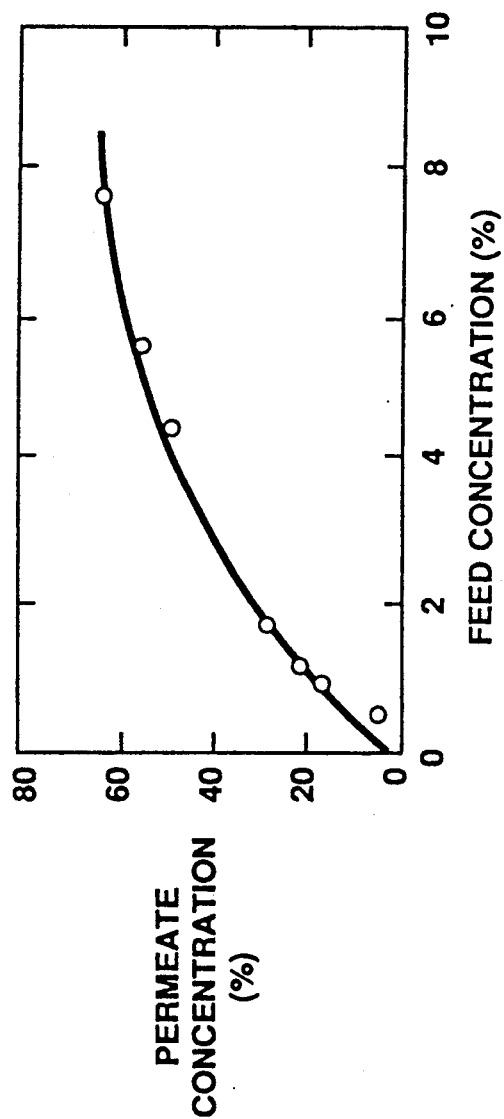
FIG. 15 is a graph showing the relationship between feed and permeate concentrations of HCFC-123 at CFC feed concentrations up to about 8 vol%.

The experimental procedures described were carried out using a feedstream containing HCFC-123 ($C_2HCl_2F_3$) in concentrations from 0.5-8 vol %. The results are summarized in FIG. 15. The calculated $CFC/N_2$ selectivity of the module remained constant at about 25 over the feed concentration range.

EXAMPLE 7

HCFC-142b.

Figure 16:
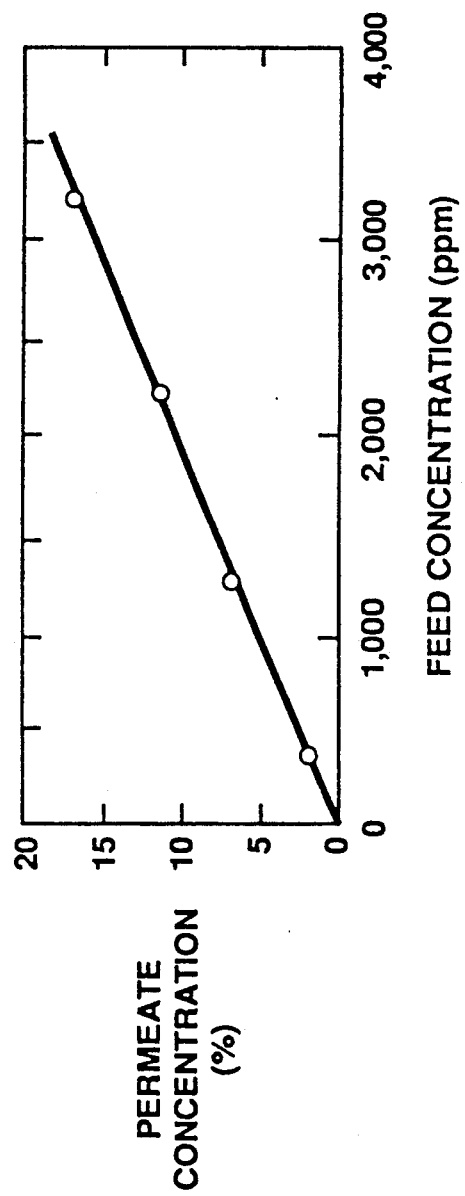
FIG. 16 is a graph showing the relationship between feed and permeate concentrations of HCFC-142b at low CFC feed concentrations.

The experimental procedures described were carried out using a feedstream containing HCFC-142b ($C_2H_3ClF_2$) in concentrations from 300-3,500 ppm. The results are summarized in FIG. 16. The calculated $CFC/N_2$ selectivity of the module increased very slightly from 13 to 15 over the feed concentration range.

EXAMPLE 8

CFC-114

Figure 17:
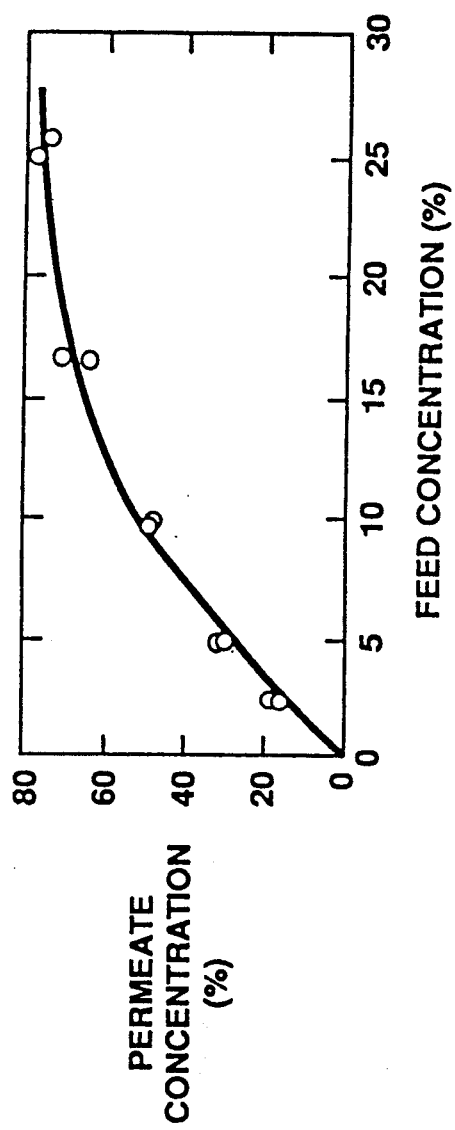
FIG. 17 is a graph showing the relationship between feed and permeate concentrations of CFC-114 at CFC feed concentrations up to about 25 vol%.

The experimental procedures described were carried out using a feedstream containing CFC-114 ($C_2Cl_2F_4$) in concentrations from 2-25 vol %. The results are summarized in FIG. 17. The calculated $CFC/N_2$ selectivity of the module increased very slightly from about 9 to 12 over the feed concentration range.

EXAMPLE 9

Halon-1301

The experimental procedures described were carried out using a feedstream containing Halon-1301 ($CF_3Br$) in concentrations from 0.1-5 vol %. A Halon/nitrogen selectivity of about 4 was obtained.

EXAMPLE 10

Carbon Dioxide

Membranes particularly suited to the separation of carbon dioxide, sulfur dioxide and ammonia from air can be prepared from commercially available poly(ether amide ester) block copolymers. A thin-film composite membrane was prepared by coating a 1-3% solution of Pebax ® 4011 (Atochem, Inc.) in butanol onto a polysulfone microporous support membrane. Permeability experiments were carried out using a feed stream containing 8% carbon dioxide in an air mixture. The carbon dioxide flux at 61° C. was $6.05 \times 10^{-4}$ $cm^3(STP)/cm^2 \cdot s \cdot cmHg$. The calculated carbon dioxide/nitrogen selectivity was 26.

EXAMPLE 11

Sulfur Dioxide

A thin-film composite membrane was prepared as in Example 10. Permeability experiments were carried out using a feed stream containing 0.33% sulfur dioxide in an air mixture. The sulfur dioxide flux at 61° C. was $6.12 \times 10^{-3}$ cm$^3$(STP)/cm$^2$·s·cmHg. The calculated sulfur dioxide/nitrogen selectivity was 251.

EXAMPLE 12

Air-selective Membranes

Asymmetric Loeb-Sourirajan membranes were prepared using a casting solution of 14.4 wt % polyethersulfone (Victrex 52009ICI Americas) dissolved in 47.9% methylene chloride, 24% 1,1,2-trichloroethane, 6% formic acid and 7.7% butanol. The casting solution was spread on a glass plate using a hand-held spreader roll. The glass plate was then immersed in a methanol bath, causing the polymer to precipitate. After the precipitation was complete, the membranes were removed and dried. The membranes were overcoated with a 0.5- to 2-μm-thick layer of silicone rubber dissolved in octane. This silicone rubber layer sealed the membrane defects and the permselectivity of the membrane was then close to the intrinsic values obtained with thick isotropic films of the polymer.

Permeation experiments were carried out as above, using various dilute mixtures of CFC-11 in air. The membranes exhibited an oxygen flux of $2.85 \times 10^{-6}$ cm$^3$(STP)/cm$^2$·s·cmHg, a nitrogen flux of $7.45 \times 10^{-7}$ cm$^3$(STP)/cm$^2$·s·cmHg and a CFC-11 flux of $4.75 \times 10^{-8}$ cm$^3$(STP)/cm$^2$·s·cmHg. The nitrogen/CFC-11 selectivity was 16.

EXAMPLE 13

Air-selective Membranes

Asymmetric Loeb-Sourirajan membranes were prepared by a similar technique to that described in Example 12, but using a casting solution of 10 wt % polyphenylene oxide dissolved in 85% 1,1,2-trichloroethylene and 5% octanol. The casting solution was spread on a glass plate using a hand-held spreader roll. The glass plate was then immersed in a methanol bath, causing the polymer to precipitate. After the precipitation was complete, the membranes were removed and dried. The membranes were overcoated with a 0.5- to 2-μm-thick layer of silicone rubber dissolved in octane. This silicone rubber layer sealed the membrane defects and the permselectivity of the membrane was then close to the intrinsic values obtained with thick isotropic films of the polymer.

Permeation experiments were carried out as above, using various dilute mixtures of CFC-11 in air. The membranes exhibited an oxygen flux of $1.20 \times 10^{-6}$ cm$^3$(STP)/cm$^2$·s·cmHg, a nitrogen flux of $2.90 \times 10^{-7}$ cm$^3$(STP)/cm$^2$·s·cmHg and a CFC-11 flux of $3.68 \times 10^{-9}$ cm$^3$(STP)/cm$^2$·s·cmHg. The nitrogen/CFC-11 selectivity was 79.

GROUP 2 EXAMPLES

EXAMPLES 14-18

Design and Analysis of Different Purge-Gas Treatment Operations

This set of examples compares treatment of a CFC-11 laden stream by condensation alone and by the purge-gas treatment operation of the invention. Examples 14-16 are not in accordance with the invention. The stream has a flow rate of 10 scfm and contains 50% CFC-11 in all cases. The membrane calculations are all based on CFC-11 selectivities determined in single module experiments of the type described in the first group of examples. The calculations were performed using a computer program based on the gas permeation equations for cross flow conditions described by Shindo et al., "Calculation Methods for Multicomponent Gas Separation by Permeation," *Sep. Sci. Technol.* 20, 445-459 (1985). The membrane area required was generated by the computer program. The chiller capacity was extrapolated from product literature provided by Filtrine Manufacturing Company, of Harrisville, N.H. The capacities of the vacuum pumps and compressors were obtained or extrapolated from performance specification charts and other data from the manufacturers. Energy calculations were done by calculating the adiabatic ideal work of compression and dividing by the efficiency of the unit. Compressor efficiency was taken to be 60%: vacuum pump efficiency was taken to be 35%.

EXAMPLE 14

Compression to 5 Atmospheres Plus Chilling to 7° C.

The CFC-11 laden purge stream is considered to be at a pressure of 5 atmospheres, and is chilled to 7° C. and condensed. The performance is characterized as shown in Table 2.

TABLE 2

| Stream | Composition | Flow rate |
|---|---|---|
| Feed | 50% CFC-11 in air | 10 scfm |
| Liquid condensate | Pure CFC-11 | 0.77 kg/min |
| Non-condensed off-gas from condenser: | 10.9% CFC-11 | 5.6 scfm |
| Fractional recovery of CFC from feed: 88% | | |
| Energy requirement (hp) | | |
| Total: 2.96 | Compressor: 1.96 | Chiller/condenser: 1 |

EXAMPLE 15

Compression to 25 Atmospheres Plus Chilling to 7° C.

The CFC-11 laden purge stream is compressed to 25 atmospheres, then chilled to 7° C. and condensed. The performance is characterized as shown in Table 3.

TABLE 3

| Stream | Composition | Flow rate |
|---|---|---|
| Feed | 50% CFC-11 in air | 10 scfm |
| Liquid condensate | Pure CFC-11 | 0.86 kg/min |
| Non-condensed off-gas from condenser: | 2.18% CFC-11 | 5.11 scfm |
| Fractional recovery of CFC from feed: 98% | | |
| Energy requirement (hp) | | |
| Total: 6.14 | Compressor: 5.04 | Chiller/condenser: 1.1 |

EXAMPLE 16

Compression to 5 Atmospheres Plus Chilling to −27° C.

This example achieves the same performance as Example 15 above, by taking the purge gas at 5 atm pressure, but using a lower chiller temperature of −27° C. The performance is characterized as shown in Table 4.

TABLE 4

| Stream | Composition | Flow rate |
|---|---|---|
| Feed | 50% CFC-11 in air | 10 scfm |
| Liquid condensate | Pure CFC-11 | 0.86 kg/min |
| Non-condensed off-gas from condenser: | 2.18% CFC-11 | 5.11 scfm |
| Fractional recovery of CFC from feed: 98% | | |
| Energy requirement (hp) | | |
| Total: 7.46 | Compressor: 1.96 | Chiller/condenser: 5.5 |

EXAMPLE 17

Purge-Gas Treatment Operation In Accordance With An Embodiment of The Invention

A process was designed to achieve the same level of performance as in Examples 15 and 16. The process involved a condensation step followed by a membrane separation step. In the condensation step, the CFC-11 laden stream, at 5 atmospheres pressure, is chilled to 7° C. and condensed. The non-condensed off-gas from the condensation step is then subjected to a membrane separation step, using a membrane with a selectivity for CFC-11 over air of 30. A pressure drop across the membrane is provided only by the elevated pressure of the compressed feed. The permeate stream from the membrane separation step is returned for treatment in the condensation step. The performance is characterized as shown in Table 5.

TABLE 5

CONDENSATION STEP:

| Stream | Composition | Flow rate |
|---|---|---|
| Feed | 50% CFC-11 in air input + 24.3% from membrane = 43.6% | 10 scfm input + 3.33 scfm returned from membrane step = 13.33 scfm |
| Liquid condensate | Pure CFC-11 | 0.86 kg/min |
| Condenser off-gas | 10.9% CFC-11 | 8.44 scfm |

MEMBRANE SEPARATION STEP:

| Stream | Composition | Flow rate |
|---|---|---|
| Feed | 10.9% CFC-11 | 8.44 scfm |
| Residue | 2.18% CFC-11 | 5.11 scfm |
| Permeate | 24.3% CFC-11 | 3.33 scfm |
| Membrane area: 4.17 m$^2$ | | |
| Stage cut: 40% | | |
| Fractional recovery of CFC from feed: 98% | | |
| Energy requirement (hp) | | |
| Total: 3.91 | Compressor: 2.61 | Chiller/condenser: 1.3 |

Comparing this example with Examples 15 and 16, it may be seen that the process of the invention can reduce the energy demands for a treatment system to remove and recover 98% of the CFC from either 7.46 hp or 6.14 hp to 3.91 hp. In other words, the energy usage of the process is only 52% or 64% that of the comparable condensation process alone.

EXAMPLE 18

Purge-Gas Treatment Operation Employing the Process of the Invention

The process as in Example 17 was again considered. The only difference was the inclusion of a small vacuum pump on the permeate side of the membrane to lower the permeate pressure to 15 cmHg. The performance is characterized as shown in Table 6.

TABLE 6

CONDENSATION STEP:

| Stream | Composition | Flow rate |
|---|---|---|
| Feed | 50% CFC-11 in air input + 49.3% from membrane = 49.9% | 10 scfm input + 1.16 scfm returned from membrane step = 11.16 scfm |
| Liquid condensate | Pure CFC-11 | 0.86 kg/min |
| Condenser off-gas | 10.9% CFC-11 | 6.27 scfm |

MEMBRANE SEPARATION STEP:

| Stream | Composition | Flow rate |
|---|---|---|
| Feed | 10.9% CFC-11 | 6.27 scfm |
| Residue | 2.18% CFC-11 | 5.11 scfm |
| Permeate | 49.3% CFC-11 | 1.16 scfm |
| Membrane area: 0.81 m$^2$ | | |
| Stage cut: 18% | | |
| Fractional recovery of CFC from feed: 98% | | |
| Energy requirement (hp) | | |
| Total: 3.93 | Compressor: 2.19 Vacuum pump 0.44 | Chiller/condenser: 1.3 |

Comparing this example with Example 17, several differences are apparent. To reduce the residue concentration to 2.18% in Example 17 requires a relatively high stage cut of 40%. The permeate volume flow is high, 3.33 scfm, so a more powerful compressor is needed to handle the additional load returned from the membrane unit. The membrane area, 4.17 m$^2$, is also large. The use of a vacuum pump to lower the pressure on the permeate side means that the same degree of CFC removal can be achieved with a much smaller membrane area, 0.81 m$^2$, and a much lower stage cut, 18%. There is a corresponding saving in the energy requirements of the compressor. However, the energy used by the vacuum pump makes the overall energy demand of the system about the same in both cases. Both schemes achieve major improvements in performance compared with condensation alone.

EXAMPLES 19-21

This set of examples compares treatment of a gas stream containing sulfur dioxide in air by condensation alone and by a representative purge-gas treatment operation in accordance with the invention. The stream has a flow rate of 10 scfm and contains 50% sulfur dioxide in all cases. The calculations are performed in similar manner to those for the CFC-11 examples. The membrane calculations were based on the performance of composite membranes having a permselective layer of polyamide-polyether block copolymer. The membrane selectivity for sulfur dioxide over air was taken to be 100, and the normalized sulfur dioxide flux was $6 \times 10^{-3}$ cm$^3$(STP)/cm$^2$·s·cmHg.

EXAMPLE 19

Compression to 8 Atmospheres Plus Chilling to 6° C.

The sulfur dioxide laden purge stream is considered to be available at 8 atmospheres pressure, and is chilled to 6° C. and condensed. The boiling point of sulfur dioxide is −10° C., so under these conditions 25% sulfur dioxide remains in the vent gas from the condenser. The performance is characterized as shown in Table 7.

TABLE 7

| Stream | Composition | Flow rate |
|---|---|---|
| Feed | 50% SO$_2$ in air | 10 scfm |
| Liquid condensate | Pure SO$_2$ | 0.3 kg/min |
| Non-condensed | 25% SO$_2$ | 6.25 scfm |

TABLE 7-continued

| Stream | Composition | Flow rate |
|---|---|---|
| off-gas from condenser: | | |

EXAMPLE 20

Compression to 40 Atmospheres Plus Chilling to 6° C.

The sulfur dioxide laden stream is compressed to 40 atmospheres, then chilled to 6° C. and condensed. The sulfur dioxide content of the vent gas is reduced to 5% under these conditions, but the energy and cost requirements of the system are more than double those of Example 19. The performance is characterized as shown in Table 8.

TABLE 8

| Stream | Composition | Flow rate |
|---|---|---|
| Feed | 50% $SO_2$ in air | 10 scfm |
| Liquid condensate | Pure $SO_2$ | 0.38 kg/min |
| Non-condensed off-gas from condenser: | 5% $SO_2$ | 5.26 scfm |

EXAMPLE 21

Purge-Gas Treatment Operation in Accordance With the Invention

A process was designed employing the condensation step exactly as in Example 19, followed by a membrane separation step to treat the condensation step vent gas stream, using a membrane with a selectivity for sulfur dioxide over air of 100. A pressure drop across the membrane is provided only by the elevated pressure of the compressed feed. The performance is characterized as shown in Table 9.

TABLE 9

| Stream | Composition | Flow rate |
|---|---|---|
| CONDENSATION STEP | | |
| Feed | 50% $SO_2$ in air | 10 scfm |
| Liquid condensate | Pure $SO_2$ | 0.40 kg/min |
| Non-condensed off-gas from condenser: | 25% $SO_2$ | 6.25 scfm |
| MEMBRANE SEPARATION STEP: | | |
| Feed | 25% $SO_2$ | 6.25 scfm |
| Residue | 1.0% $SO_2$ | 5.05 scfm |
| Permeate | 55.6 $SO_2$ | 1.20 scfm |

The permeate from the membrane separation step is richer in sulfur dioxide content than the original gas stream to be treated, and can be returned for treatment by the condensation step. The process is able to reduce the concentration of sulfur dioxide in the vented gas stream from 25% to 1%, with no extra energy consumption whatsoever, because the driving force for membrane permeation is provided by the relatively high pressure of the already compressed feed.

EXAMPLE 22

Propylene/Ethylene Cascade Refrigeration Cycle

A two-stage cascade refrigeration cycle employing ethylene and propylene is used to produce refrigeration at −145° F. A system of this type is described in FIG. 8.26, page 226 in *Chemical Process Equipment Handbook*, Butterworth's Series in Chemical Engineering. In this system, propylene vapor in the first stage is compressed to 245-250 psia and cooled with water to 116° F. forming the liquid propylene. This liquid is then expanded to 16 psia to produce a cold vapor. This cold vapor is passed through a heat exchanger and provides cooling to liquify ethylene vapor at a pressure of 230-240 psia in the second stage of the cascade. Expansion of this ethylene liquid to 12 psia produces an ethylene vapor at a temperature of −145° F. The low-pressure portion of the ethylene cycle is subject to air leaks. Suppose that the purge stream from the ethylene cycle contains 2-10% air. Typically, this purge stream will first be cooled to −140° F. in a purge-gas condenser. At a purge gas pressure of 240 psia, the condensation operation will produce a liquid ethylene stream and a non-condensed stream, consisting of 90% air and 10% ethylene, at a rate of approximately 10 scfm. This pressurized vent gas is most economically passed across the surface of a silicone rubber membrane. This membrane is 8 times more permeable to ethylene than nitrogen and 4 time more permeable to ethylene than oxygen. The membrane thus fractionates the gas into a 5.2 scfm residue stream containing 99% air and 1% ethylene, which can be discharged to the atmosphere, and a low-pressure permeate stream containing 19.7% ethylene and 80.3% air. The permeate stream may be returned directly to the low-pressure side of the refrigeration cycle, or recompressed to 240 psia and introduced in front of the −140° F. purge-gas condenser.

EXAMPLE 23

Ammonia Refrigeration Cycle

Ammonia is often used as a refrigerant in compression refrigeration systems to provide cooling in the 20° to −50° F. range. In these systems, non-condensable gases collect in high pressure side of the cycle and must be removed as a purge stream. Consider, for example, a refrigerator using ammonia with a condenser liquid ammonia temperature on the high-pressure side of 95° F. At this temperature the vapor pressure of ammonia is 197 psia. However, not uncommonly, the actual operating pressure will be on the order of 210 psia. The extra 13 psia represents 6% non-condensable gases (air, hydrogen, nitrogen, etc.). This gas must be purged at a rate determined by the rate of appearance of non-condensable gas in the refrigeration cycle. Suppose that the purge-gas stream, containing 6% air or other non-condensable gases, is first subjected to a condensation step using cooling to −40° C. provided by the refrigeration cycle. The ammonia concentration in the vent gas leaving the condenser will be 4.9%. The condenser vent gas is then passed to a membrane separation unit, containing a thin-film composite membrane with a silicone rubber permselective layer. Such a membrane has a selectivity of 20 for ammonia over nitrogen and 10 for ammonia over oxygen. Depending on the stage-cut, the membrane operation could produce a residue stream containing 0.5% ammonia, and a permeate stream containing 16% ammonia, down to a residue stream containing about 0.05% ammonia, and a permeate stream containing 10% ammonia. By using a two-step process, the concentration of ammonia in the residue stream could be reduced even further if necessary.

EXAMPLE 24

CFC-12 Recovery

Consider an embodiment of the invention as shown in FIG. 1, with CFC-12 as refrigerant. Based on our experimental data, we assume a membrane selectivity for CFC-12 over air of 6-10. Consider a purge gas stream containing 10 scfm air, contaminated with 67 scfm of CFC-12, to produce an 87% CFC-12 stream. The stream emerges from the purge withdrawal operation at 90 psia, and is first passed through a condenser operating at −60° F. The condenser reduces the CFC content of the gas to 5% CFC-12. This resulting stream is passed to a membrane unit, which selectively permeates the CFC. As a result, a 10 scfm stream containing 0.5% CFC-12 is formed and can be vented. The permeate stream from the membrane separation operation contains 11% CFC-12, and could be recompressed with a small compressor and passed back to the cold condenser.

As an alternative, the CFC-12 content of the vent stream could be reduced to 0.05% by using a two-step membrane separation operation as shown in FIG. 7. In this case the permeate from the second step could be returned to the inlet of the first step. The purge stream treatment operation still only produces two streams therefore: the vent gas stream containing 0.05% CFC-12, and the liquid CFC-12 stream from the condensation step.

EXAMPLE 25

Purge-Gas Treatment Using Air-Selective Membrane Step

Consider an embodiment of the invention as shown in FIG. 4, used to treat a purge-gas stream at a pressure of 100 psig, containing 90% of an unspecified refrigerant, mixed with 9.4% nitrogen and 0.6% oxygen. Assume that the membrane selectivity for oxygen over nitrogen is 4, and that the membrane unit is run with a stage-cut of 1%. Assume further that, to increase the pressure difference across the membrane, a vacuum pump is used on the permeate side of the membrane to lower the pressure on the permeate side to 1 cmHg. Using a computer model based on the computational methods of Shindo et al. (Shindo et al., "Calculation Methods for Multicomponent Gas Separation by Permeation," Sep. Sci. Technol. 20, 445–459 (1985)), the amount of refrigerant remaining in the permeate stream from the membrane unit was calculated as a function of the membrane selectivity. The results are summarized in Table 10.

TABLE 10

Refrigerant in vent stream as a function of membrane selectivity for air-selective membranes used to treat refrigerator purge gas.

| Selectivity $N_2$/refrigerant | Refrigerant in exhaust (%) |
| --- | --- |
| 10 | 44.4 |
| 20 | 28.9 |
| 50 | 14.2 |
| 100 | 7.7 |
| 200 | 4.0 |
| 500 | 1.64 |
| 1,000 | 0.83 |

It may be seen that extremely air-selective membranes are required to reduce the refrigerant content of the purge gas to an acceptable level in a single pass.

EXAMPLE 26

Purge-Gas Treatment Using Air-Selective Membrane Step and Condensation Step

Consider an embodiment of the invention as shown in FIG. 5, in which a condensation step is used to treat the purge-gas stream prior to the membrane separation step. Suppose that as a result, the refrigerant content of the stream being passed to the membrane separation operation is reduced to 5%. Suppose that the feed to the membrane separation step remains at 100 psig, and that a vacuum pump is used as before to lower the permeate pressure to 1 cmHg. The calculation as in Example 22 was repeated, and the results are summarized in Table 11.

TABLE 11

Refrigerant in vent stream as a function of membrane selectivity for air-selective membranes used to treat refrigerator purge gas.

| Selectivity $N_2$/refrigerant | Refrigerant in exhaust (%) |
| --- | --- |
| 10 | 0.45 |
| 20 | 0.23 |
| 50 | 0.090 |
| 100 | 0.045 |
| 200 | 0.0225 |
| 500 | 0.0090 |
| 1,000 | 0.0045 |

As can be seen from the Table, the residue of refrigerant remaining in the vent gas is now reduced to an extremely low level, even when membranes with modest selectivities are used.

EXAMPLE 27

Purge-Gas Treatment Using Air-Selective Membrane Step and Condensation Step

The calculation of Example 26 was repeated, the only difference being that no vacuum pump was used, so that the pressure on the permeate side of the membrane remained at 76 cmHg. The results are summarized in Table 12.

TABLE 12

Refrigerant in vent stream as a function of membrane selectivity for air-selective membranes used to treat refrigerator purge gas.

| Selectivity $N_2$/refrigerant | Refrigerant in exhaust (%) |
| --- | --- |
| 10 | 0.53 |
| 20 | 0.27 |
| 50 | 0.11 |
| 100 | 0.054 |
| 200 | 0.027 |
| 500 | 0.011 |
| 1,000 | 0.0054 |

As can be seen from the Table, the residue of refrigerant remaining in the vent gas is reduced to an extremely low level, even when membranes with modest selectivities are used, and a smaller pressure drop is available.

We claim:

1. A process, comprising:
   a) a refrigeration step, comprising compressing and expanding a refrigerant, said step being carried out in a refrigeration system;
   b) a purge step, comprising withdrawing from said refrigeration system a purge gas comprising said refrigerant and air;
   c) a purge-gas treatment step, comprising (i) a condensation step, followed by (ii) a membrane separation step.

wherein said condensation step comprises;
   bringing said purge gas to a condition characterized in that the concentration of said refrigerant is greater than its saturation concentration at said condition, so that condensation of a portion of said refrigerant occurs;
   withdrawing a condensed stream comprising said refrigerant in liquid form;

withdrawing a non-condensed stream depleted in said refrigerant compared with said purge gas; and wherein said membrane separation step comprises; providing a membrane having a feed side and a permeate side; passing said non-condensed stream from said condensation step across said feed side; withdrawing from said permeate side a permeate stream enriched in said refrigerant compared with said non-condensed stream.

2. The process of claim 1, wherein said permeate stream is recycled to said refrigeration step.

3. The process of claim 1, wherein said membrane is a composite membrane comprising a microporous support layer and a thin permselective coating layer.

4. The process of claim 1, wherein said membrane has a selectivity for said refrigerant over nitrogen of at least 5.

5. The process of claim 1, wherein said membrane has a selectivity for said refrigerant over air of at least 10.

6. The process of claim 1, wherein said refrigerant comprises a refrigerant selected from the group consisting of chlorinated hydrocarbons, CFCs and HCFCs.

7. The process of claim 1, wherein said refrigerant comprises a refrigerant selected from the group consisting of sulfur dioxide and ammonia.

8. The process of claim 1, wherein said condensation step comprises chilling said purge gas.

9. The process of claim 1, wherein said membrane separation step is performed at a feed gas temperature below ambient temperature.

10. The process of claim 9, wherein said feed gas is chilled to a temperature below ambient temperature by bringing said feed gas into heat transferring relationship with said refrigeration step before said feed gas is passed across said membrane.

11. The process of claim 1, wherein at least 90% of said refrigerant present in said feed gas to said membrane separation step is recovered in said permeate stream.

12. The process of claim 1, wherein said permeate stream is recycled to said condensation step (i).

13. The process of claim 1, wherein said membrane separation step comprises:
providing a membrane array, each membrane within said array having a feed side and a permeate side;
passing a feed gas comprising said refrigerant and air across said membrane array;
withdrawing from said membrane array a product permeate stream enriched in said refrigerant compared with said feed gas.

14. The process of claim 13, wherein said membrane array comprises a multiplicity of membrane units connected in a series arrangement.

15. The process of claim 13, wherein said membrane array comprises a multiplicity of membrane units connected in a cascade arrangement.

16. The process of claim 1, wherein said membrane separation step is performed with said feed gas at a pressure of at least 60 psia.

17. The process of claim 1, wherein said membrane separation step is performed with said feed gas at atmospheric pressure, and wherein a refrigerant flux through the membrane is induced by creating a partial vacuum on said permeate side.

18. A process, comprising:
a) a refrigeration step, comprising compressing and expanding a refrigerant, said step being carried out in a refrigeration system;
b) a purge step, comprising withdrawing from said refrigeration system a purge gas comprising said refrigerant and air;
c) a purge-gas treatment step, comprising submitting said purge gas to a membrane separation step, wherein membrane separation step comprises: passing a feed gas comprising said refrigerant and air across a membrane having a feed side and a permeate side; and withdrawing from said feed side a residue stream enriched in said refrigerant compared with said feed gas.

19. The process of claim 18, wherein said purge-gas treatment step comprises (i) a condensation step, followed by (ii) a membrane separation step, and wherein said condensation step comprises:
bringing said purge gas to a condition characterized in that the concentration of said refrigerant is greater than its saturation concentration at said condition, so that condensation of a portion of said refrigerant occurs;
withdrawing a condensed stream comprising said refrigerant in liquid form;
withdrawing a non-condensed stream depleted in said refrigerant compared with said purge gas;
and wherein said membrane separation step comprises:
providing a membrane having a feed side and a permeate side;
passing said non-condensed stream from said condensation step across said feed side; withdrawing from said feed side a residue stream enriched in said refrigerant compared with said non-condensed stream.

* * * * *